US006999755B2

(12) United States Patent  
Park

(10) Patent No.: US 6,999,755 B2  
(45) Date of Patent: Feb. 14, 2006

(54) METHOD AND DEVICE FOR PROVIDING INFORMATION OF UNFINISHED CALL

(75) Inventor: Kee-Oh Park, Goyang-si (KR)

(73) Assignee: Welgate Corp., Seoul (KR)

(*) Notice: Subject to any disclaimer, the term of this patent is extended or adjusted under 35 U.S.C. 154(b) by 0 days.

(21) Appl. No.: 10/503,933

(22) PCT Filed: Jan. 14, 2003

(86) PCT No.: PCT/KR03/00071

§ 371 (c)(1),  
(2), (4) Date: Feb. 14, 2005

(87) PCT Pub. No.: WO03/077570

PCT Pub. Date: Sep. 18, 2003

(65) Prior Publication Data

US 2005/0130632 A1   Jun. 16, 2005

(30) Foreign Application Priority Data

Mar. 12, 2002 (KR) .................. 10-2002-0013280  
Mar. 12, 2002 (KR) .................. 10-2002-0013281  
Jan. 13, 2003 (KR) .................. 10-2003-0002175

(51) Int. Cl.  
H04M 3/42 (2006.01)  
H04J 3/16 (2006.01)

(52) U.S. Cl. ............... 455/414.1; 455/417; 379/211.1; 379/211.02; 379/210.01; 379/111; 370/466

(58) Field of Classification Search ............ 455/414.1, 455/417, 415, 528; 370/466  
See application file for complete search history.

(56) References Cited

U.S. PATENT DOCUMENTS 5,832,060 A * 11/1998 Corlett et al. ............ 379/88.19  
5,995,848 A * 11/1999 Nguyen .................... 455/528  
6,014,436 A * 1/2000 Florence et al. ........ 379/211.01  
6,049,713 A * 4/2000 Tran et al. ................ 455/415  
6,154,644 A * 11/2000 Murray .................... 455/414.1

(Continued)

FOREIGN PATENT DOCUMENTS

KR 1998-0051986 9/1998  
KR 2001-0079195 8/2001

OTHER PUBLICATIONS

English Language Abstract of KR 2001-0079195.  
U.S. Appl. No. 10/863,391, filed Jun. 9, 2004.

Primary Examiner—William Trost  
Assistant Examiner—Kiet Doan  
(74) Attorney, Agent, or Firm—Greenblum & Bernstein, P.L.C.

(57) ABSTRACT

The present invention relates to a method and apparatus for providing a calling number of an incomplete call, and in more detail, a method and apparatus for providing a calling number of an incomplete call for a receiving terminal when the incomplete call, which cannot receive a call, occurs. A calling number providing system provides the calling number of an incomplete call, wherein the system comprises a TCAP connector, a TCAP message receiver, a TCAP message analyzing unit, an incomplete call logging unit, a message informing unit, a controller, a message searching unit, a short message creator, a database broker, and SMCI/SMPP message constructing unit, a short message dispatching unit, and an SMCI/SMPP connector.

19 Claims, 15 Drawing Sheets

U.S. PATENT DOCUMENTS

| | | | |
|---|---|---|---|
| 6,411,681 B1 * | 6/2002 | Nolting et al. | 379/1.01 |
| 6,826,397 B1 * | 11/2004 | Vasa | 455/417 |
| 6,879,677 B1 * | 4/2005 | Trandal et al. | 379/215.01 |
| 2003/0043989 A1 * | 3/2003 | Creamer et al. | 379/211.02 |
| 2003/0081752 A1 * | 5/2003 | Trandal et al. | 379/210.01 |
| 2003/0147418 A1 * | 8/2003 | Edlund et al. | 370/466 |
| 2005/0013425 A1 * | 1/2005 | Contractor | 379/201.12 |
| 2005/0069109 A1 * | 3/2005 | Elias et al. | 379/111 |

* cited by examiner

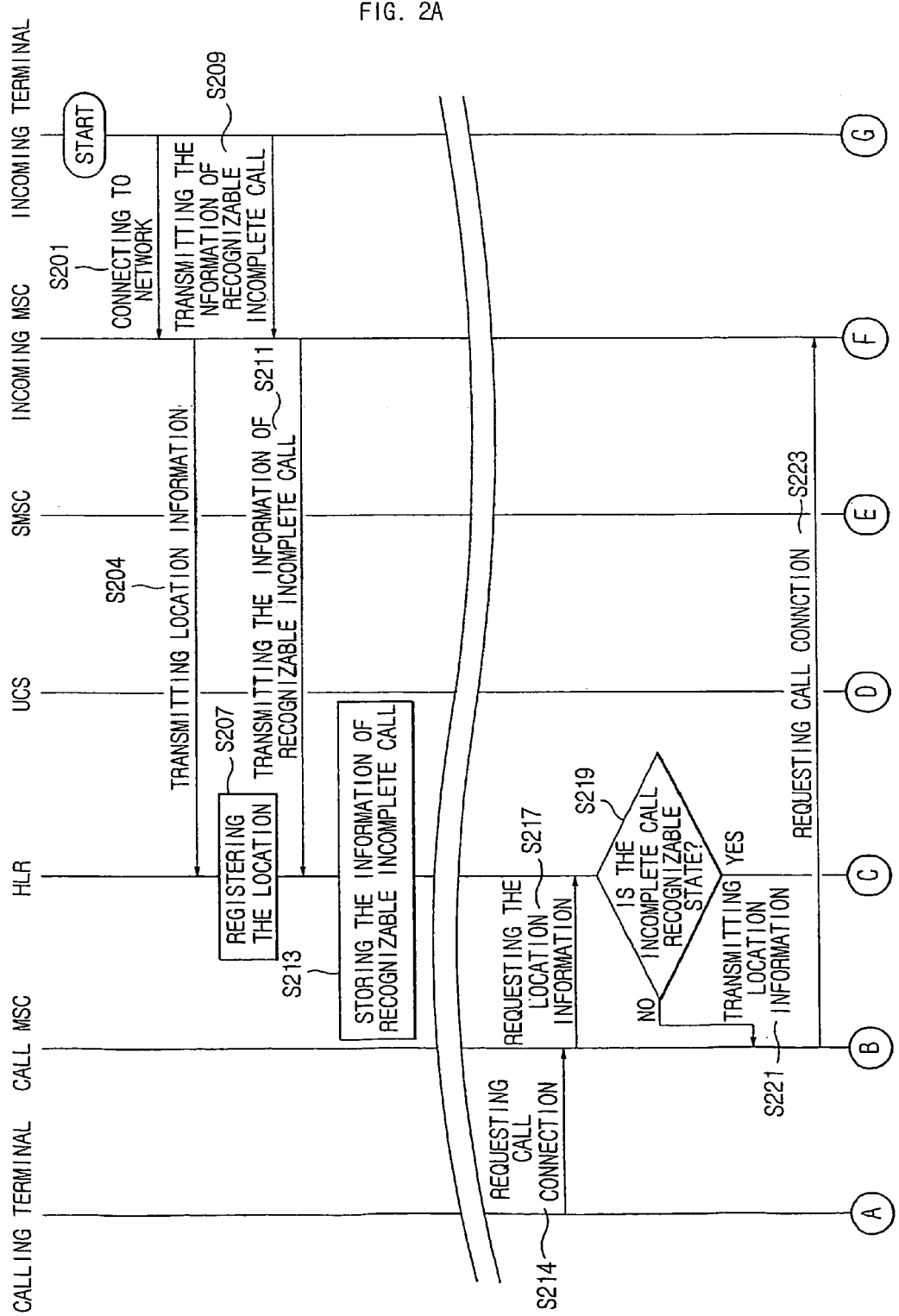

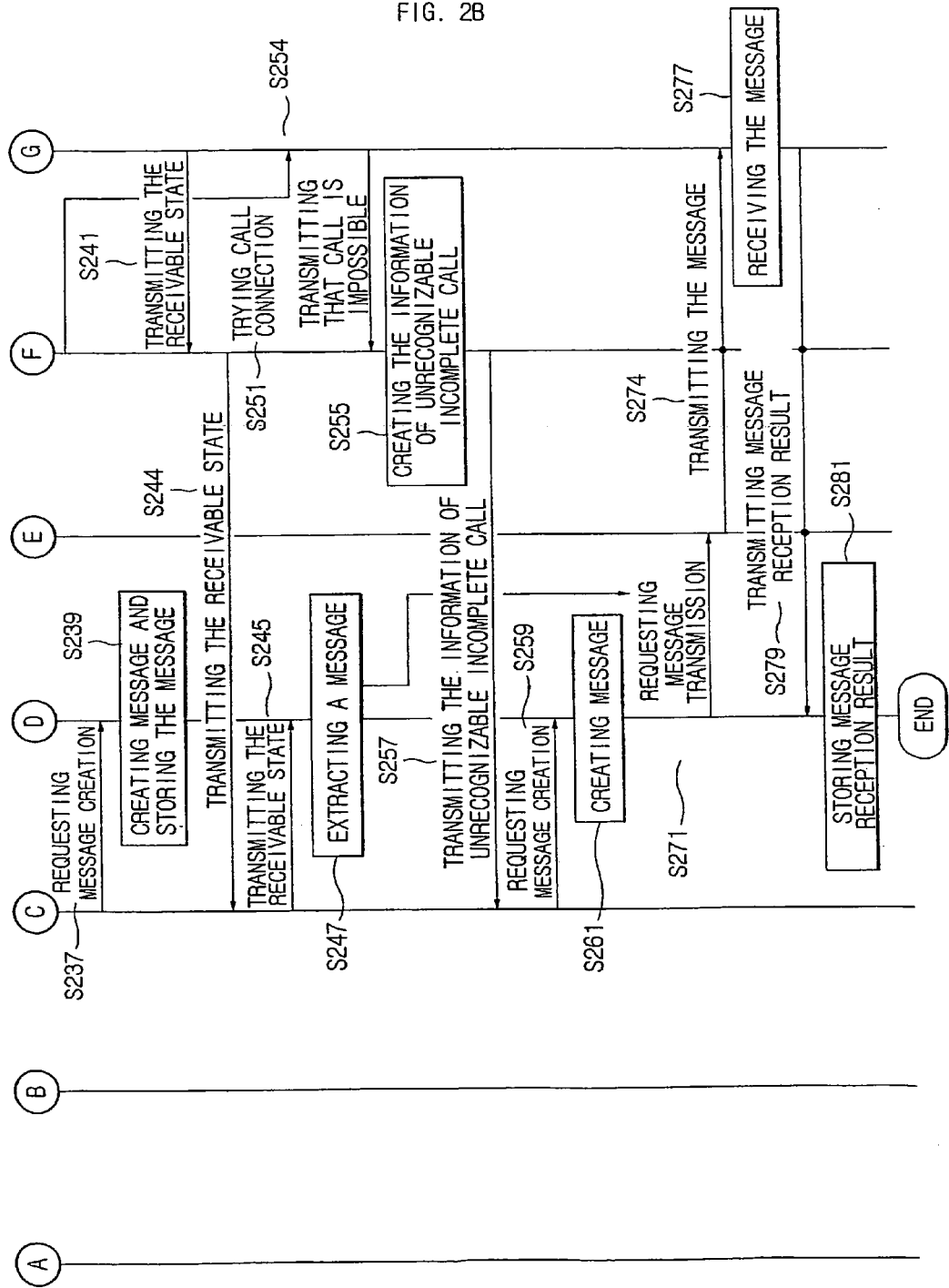

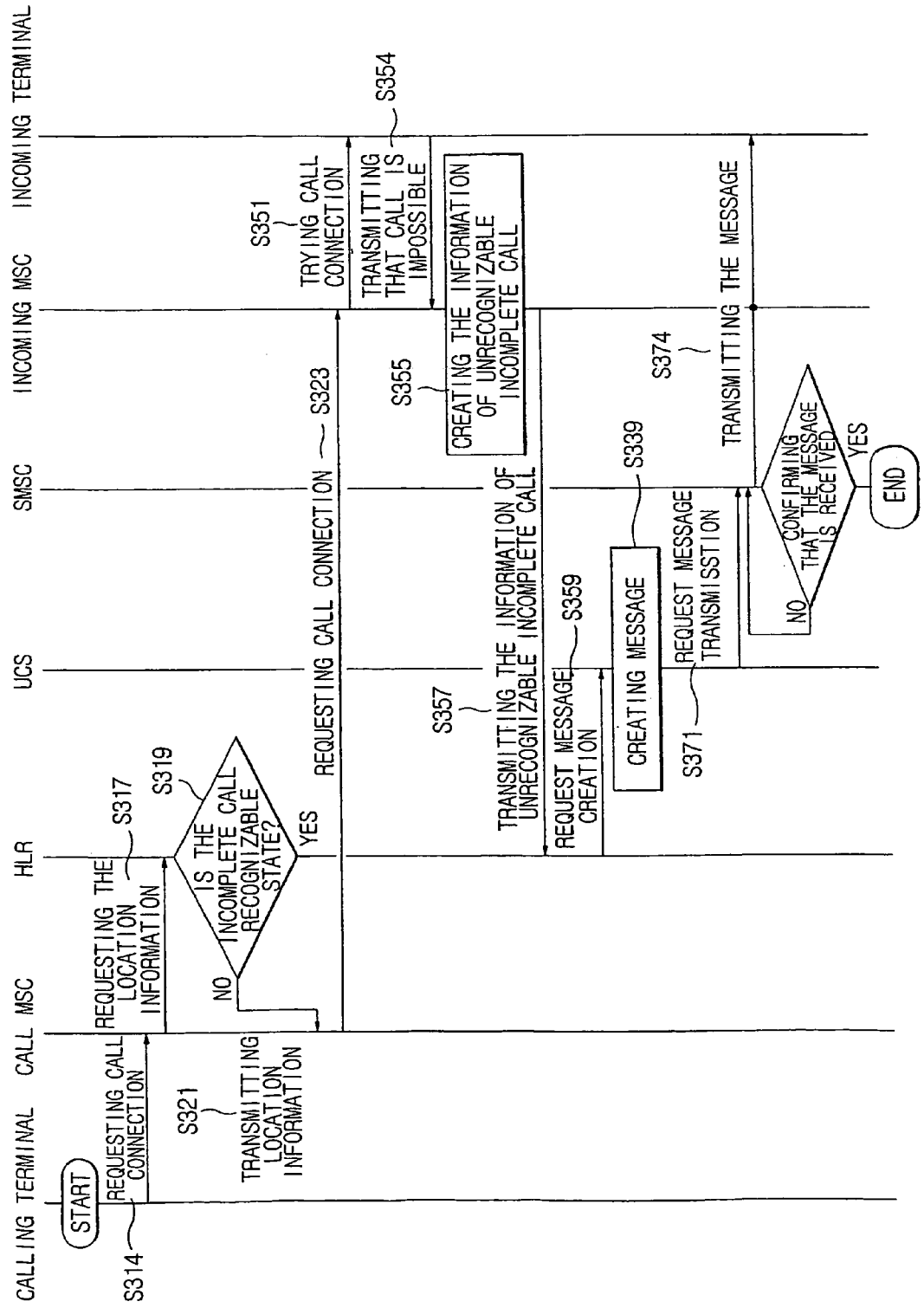

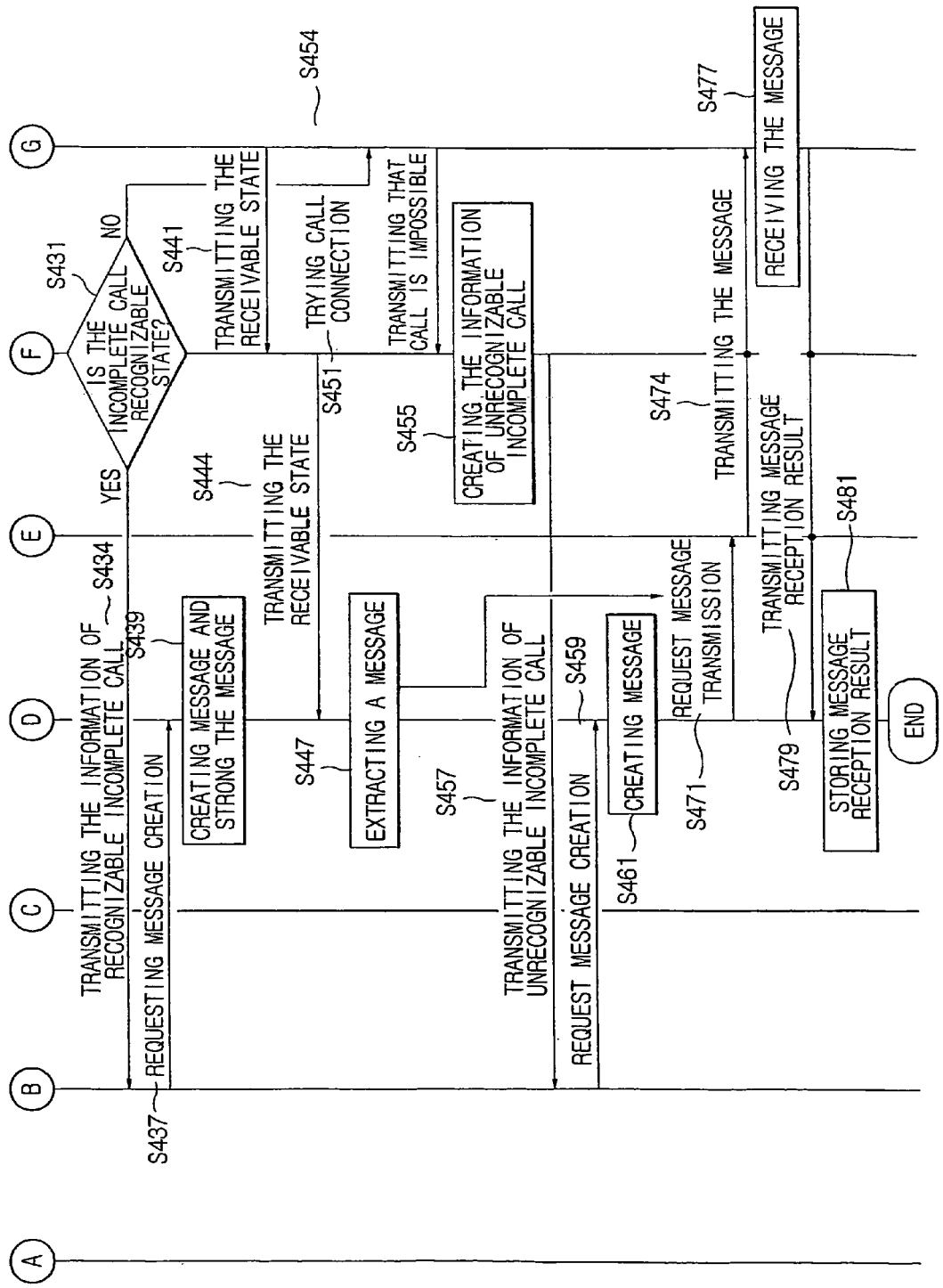

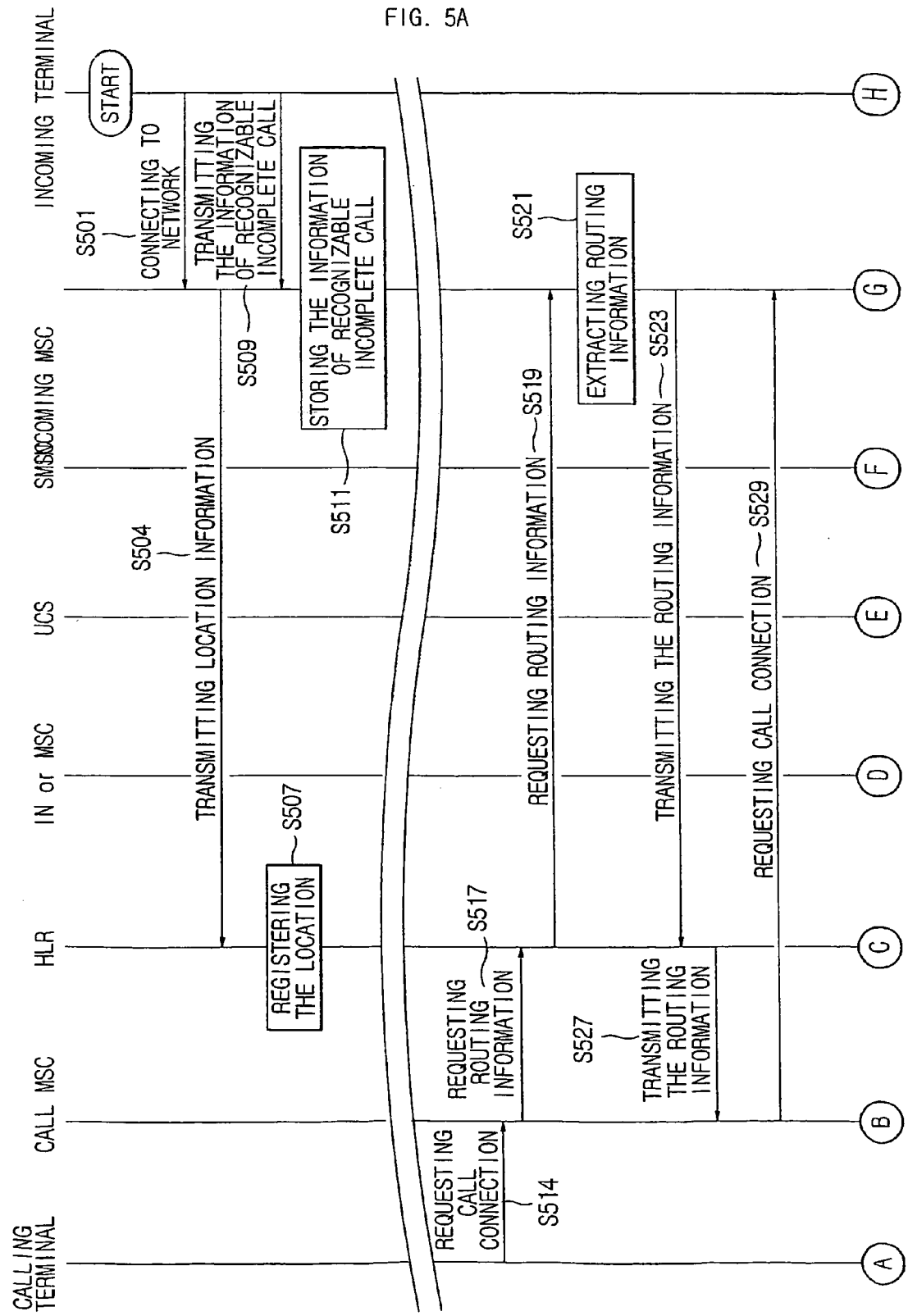

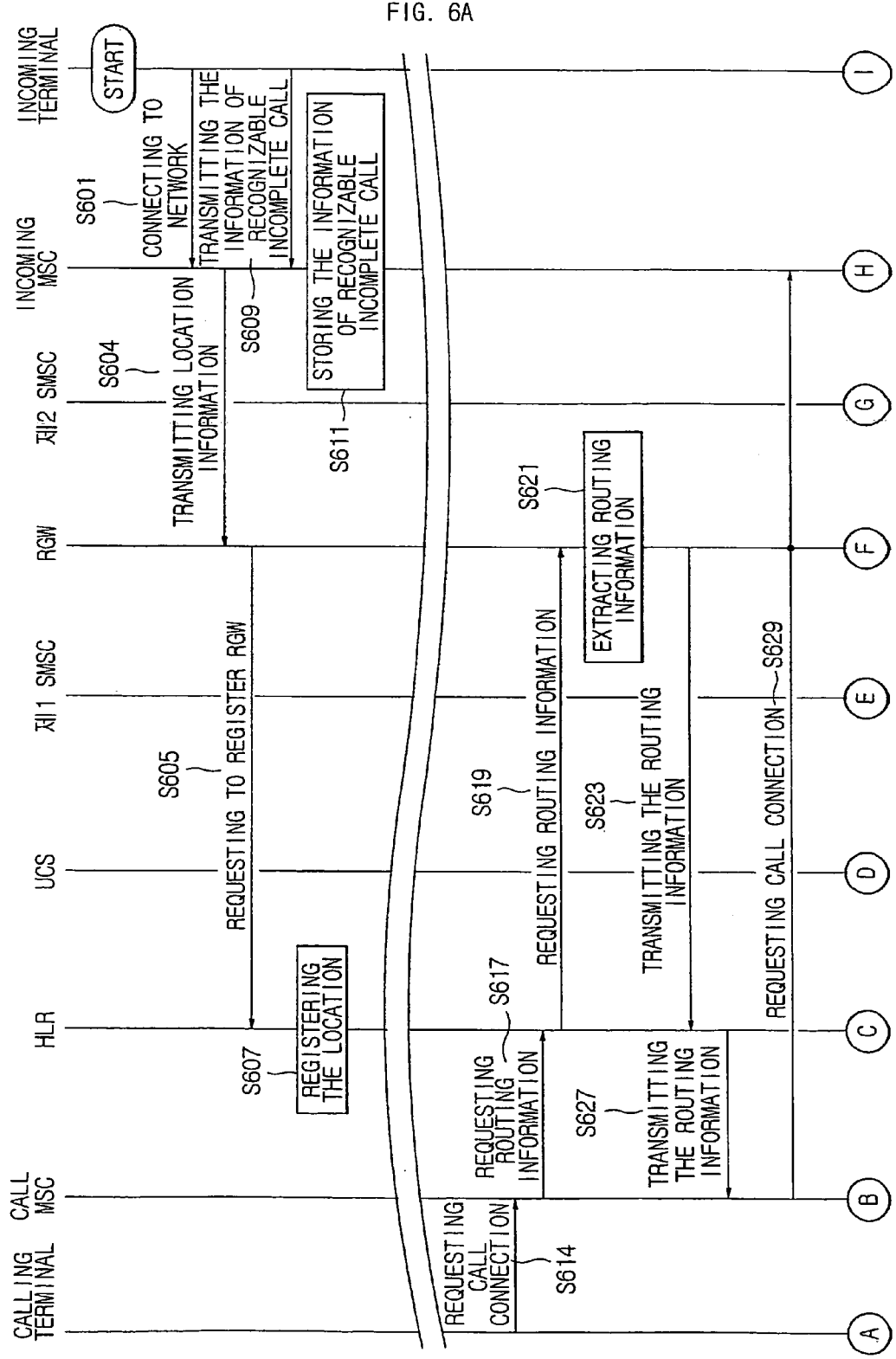

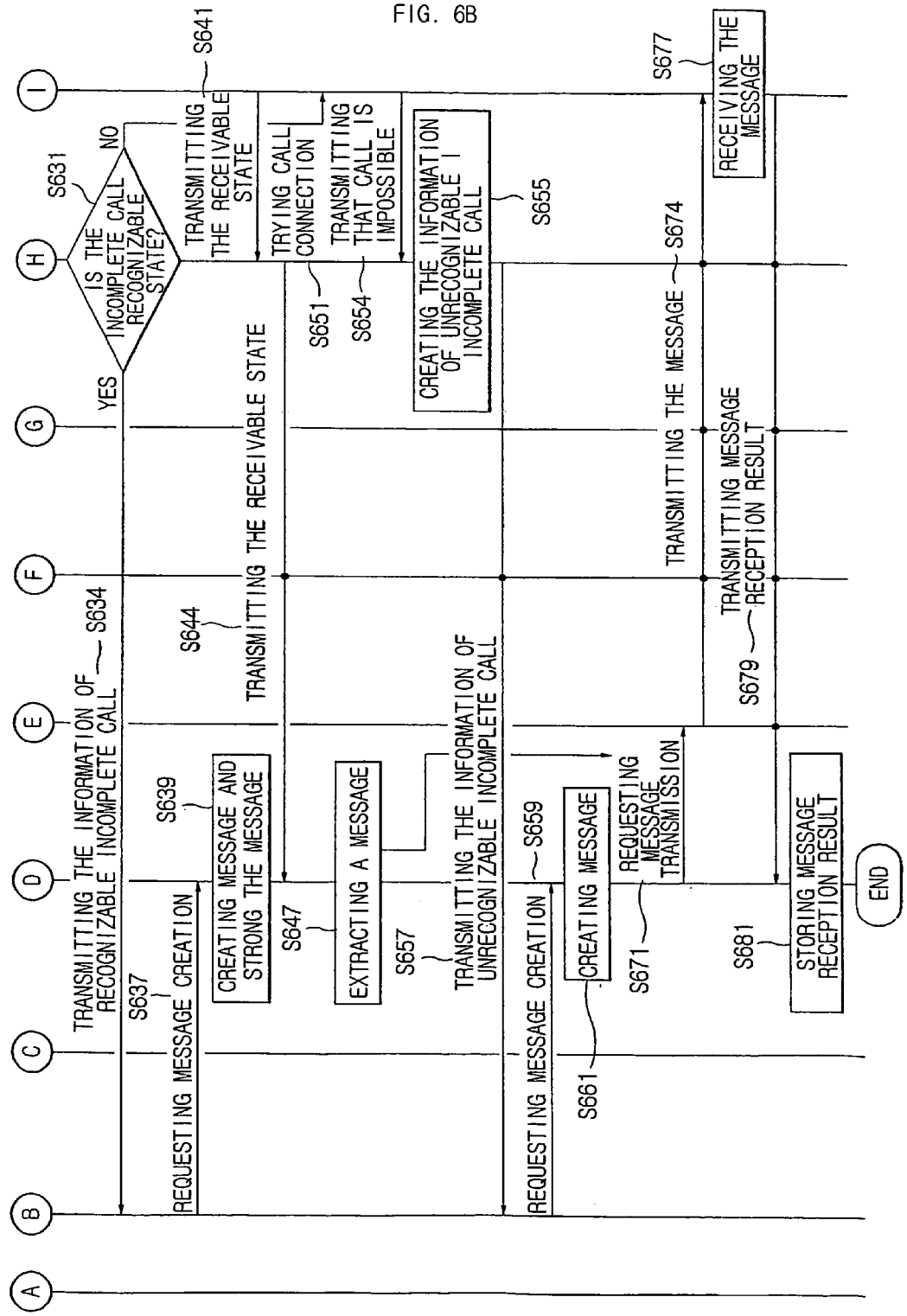

though the power supply is OFF in the midst of an incomplete call, service area secession, receiving conversion, reception refusal, and voice mail connection, the caller cannot use the CNIP service.

METHOD AND DEVICE FOR PROVIDING INFORMATION OF UNFINISHED CALL

TECHNICAL FIELD

The present invention relates to a method and apparatus for providing a calling information of an unfinished call(i.e, incomplete call), and in more detail, a method and apparatus for providing a calling information of an incomplete call for a receiving terminal when the incomplete call, which could not receive a call, occurred.

BACKGROUND OF THE INVENTION

At the present time various auxiliary services relevant to a portable telephone are being provided accordingly as mobile communication technology has become more popular and network technology is being developed. However, in spite of the popularization of the portable telephone, an incomplete call, (i.e, when the caller terminal cannot connect to the receiving terminal), still occurs frequently. In more detail this incomplete call describes the situation in which a mobile phone subscriber(caller) cannot speak over the telephone with another person(receiver) when the receiving terminal is within a particular condition such as power off, no page, busy, no answer, receiving conversion, reception refusal, voice mail connection, etc.

A variety of prior technologies relevant to providing a calling number of a portable telephone exist. These prior technologies are VMS(Voice Mail Service), RCS(Response Calling Service) System, and CNIP(Calling Number Identification Presentation) Service.

If the receiver does not answer the phone because of an incomplete call, then a voice mail menu is selected by the caller or a voice mail mode is converted so that VMS service is executed. Also the caller may provide a voice message comprising the caller's telephone number or other information through the VMS service. RCS is a method by which the caller transmits his calling number to the receiver by pushing buttons of the key input unit of the portable telephone when the receiver does not answer the phone because of an incomplete call. However, since the caller is inconvenienced by leaving a voice message or pushing buttons for a written message, when the receiver does not answer the phone then the caller generally terminates the call rather than leave a message.

CNIP(Calling Number Identification Presentation) service is service that displays the caller's calling number on the display unit of the receiver's telephone. However typical CNIP service occurs by transmitting the calling number to the receiver's telephone through a base station, a base station controller, and a mobile switching center by real time: therefore, there is limit that the service is provided only when the tone rings to the receiver's telephone. Accordingly, because the receiver's telephone does not ring when the power supply is OFF in the midst of an incomplete call, service area secession, receiving conversion, reception refusal, and voice mail connection, the caller cannot use the CNIP service.

Furthermore, if the receiver's telephone is busy with the first caller's telephone and does not provide the call waiting service, then the receiver's telephone cannot provide the CNIP service because the receiver's telephone does not ring regarding the second caller's call. To the contrary, if the receiver's telephone is busy with the first caller's telephone and provides the call waiting service, then the receiver's telephone can provide the CNIP service about the second caller's call. However, if the receiver's telephone is busy with the first caller's telephone and provides the CNIP service regarding the second caller's call but then a third caller requests a call, then the receiver's telephone cannot provide the CNIP service because the receiver's telephone does not ring regarding the third caller's call. Finally, the RCS system and CNIP service have some problems since they provide the calling number but cannot provide the caller's location information.

Therefore, one object of the present invention is to provide a method and system for providing a calling information of an incomplete call for a receiving terminal when the incomplete call occurs. A second object of the present invention is to provide a method and system for providing a calling information of an incomplete call without any operation of the caller. A third object of the present invention is to provide a method and system for providing not only the calling number but also the location information, advertisement information, etc. A fourth object of the present invention is to provide a method and system for providing the calling information efficiently based on HLR (Home Location Register) or MSC (Mobile Switching Center). A final object of the present invention is to provide a method and system for providing the calling information connected with the web server, WAP(Wireless Application Protocol) server, or IVR(Interactive Voice Response) server.

SUMMARY OF THE INVENTION

To accomplish the objects of the present invention according to one preferred embodiment of the present invention, a calling information providing system for providing a calling number of an incomplete call comprising TCAP connector for connecting the calling information providing system with an incomplete call information providing apparatus, TCAP message receiver for receiving the incomplete call from the incomplete call information providing apparatus through the TCAP connector, TCAP message analyzing unit for analyzing the incomplete call received by the TCAP message receiver message informing unit for transmitting incomplete call information, which is transmitted from an incoming MSC, to a controller, short message creator for creating a short message comprising the calling number, which is extracted from the incomplete call information and transmitting the short message to the controller, the controller for controlling the operation of the short message creator and transmitting the short message to a SMCI/SMPP message constructing unit, the SMCI/SMPP message constructing unit for converting the format of the short message into SMCI/SMPP format short message dispatching unit for transmitting the short message, which is transmitted from the SMCI/SMPP message constructing unit, to an SMCI/SMPP connector and the SMCI/SMPP connector for connecting the calling information providing system with the short message service center.

The incomplete call information providing apparatus is HLR(Home Location Register) or MSC(Mobile Switching Center).

The calling information providing system comprises a database server, which stores the incomplete call information received from the incoming MSC, and a database broker, which connects the database server with the calling information providing system.

The calling information providing system further comprises an incomplete call logging unit, which creates incomplete logging time and sets up the incomplete logging time by time information for telephone call and stores the analyzed incomplete call information on the database server through the database broker, and a message searching unit, which searches the incomplete call information corresponding to the incoming terminal after the incoming terminal has become ready for receiving.

The calling information providing system further comprises a short message dispatch logging unit for storing the short message transmission particulars of the short message dispatch logging unit on the database server through the database broker.

The calling information providing system further comprises an IVR server, which comprises a searching unit of incomplete call information for searching incomplete call information stored on the database server, a TTS engine for converting searched incomplete call information into a voice signal, and a callback unit for connecting a call by a caller terminal corresponding to the caller information comprised in the incomplete call information.

The calling information providing system further comprises a WAP server, which is a searching unit of incomplete call information for searching incomplete call information stored on the database server, and a callback unit for connecting a call by a caller terminal corresponding to the caller information comprised in the incomplete call information.

The calling information providing system further comprises an advertisement creator for creating an advertisement phrase.

The calling information providing system is equipped within a VMS apparatus or an RCS apparatus.

The incomplete call information is classified into recognizable incomplete call information and unrecognizable incomplete call information, and comprises identification information for identifying the incomplete call information.

The short message comprises a caller's number and more than one among incoming subscriber's number, caller's location information, advertisement phrase and call time.

To accomplish the objects of the present invention according to another preferred embodiment of the present invention, the present invention is provided for receiving a call connection request comprising a caller's number and an incoming subscriber's number from a calling terminal, requesting location information corresponding to a incoming terminal from a HLR(home location register), extracting location information and incomplete call information of the incoming terminal, transmitting request for message creating, which comprises the incomplete call information, to a calling information providing system, creating a short message comprising a calling number, requesting message transmission for a short message service center and transmitting the short message to the incoming terminal through an incoming MSC.

If the incomplete call information is recognizable, then the method further comprises the steps of storing the short message, receiving information regarding whether or not ready to be received, receiving information regarding whether or not ready to be received from the incoming MSC through the HLR(home location register) and extracting incomplete information corresponding to the incoming terminal.

If the incomplete call information is unrecognizable, then the method further comprises the steps of trying to connect a call to the incoming terminal, creating the information of unrecognizable incomplete call when call connection fails and transmitting the information of unrecognizable incomplete call to the calling information providing system.

The calling information providing system transmits the short message by using a scheduling function periodically until the incoming terminal receives the short message.

The short message comprises advertisement information or caller's location information.

To accomplish the objects of the present invention according to another preferred embodiment of the present invention, the present invention is provided for receiving a call connection request comprising a caller's number and an incoming subscriber's number from a calling terminal, requesting routing information about an incoming MSC from an incoming MSC, to which an incoming terminal connects, receiving the routing information from the incoming MSC, requesting a call connection with the incoming MSC, extracting incomplete call information corresponding to the incoming terminal, transmitting a request for message creation, which comprises the incomplete call information, to a calling information providing system, creating a short message comprising a calling number requesting message transmission to a short message service center and transmitting the short message to the incoming terminal through an incoming, MSC.

The calling information providing system receives the request for message creation through an intelligent network, which is connected with the calling information providing system or another switching center.

The incoming MSC transmits the request for message creation, which comprises the incomplete call information, to the calling information providing system through the calling MSC.

If the incomplete call information is recognizable then the method further comprises the steps of storing the short message, receiving information regarding whether or not ready to be received, receiving information regarding whether or not ready to be received from incoming MSC and extracting incomplete information corresponding to the incoming terminal.

If the incomplete call information is unrecognizable, then the method further comprises the steps of trying to connect the call to the incoming terminal, creating the information of unrecognizable incomplete call when call connection fails and transmitting the information of unrecognizable incomplete call to the calling information providing system.

The short message comprises advertisement information or caller's location information.

To accomplish the objects of the present invention according to another preferred embodiment of the present invention, the present invention is provided for receiving a call connection request comprising a caller's number and an incoming subscriber's number from a calling terminal, requesting routing information about an incoming MSC, to which incoming terminal connects to roaming gateway that is connected with the incoming MSC receiving the routing information from the roaming gateway, requesting call connection with the incoming MSC, extracting incomplete call information corresponding to the incoming terminal, transmitting a request for message creation, which comprises the incomplete call information, to a calling information providing system creating a short message comprising a calling number, requesting message transmission to the first short message service center and transmitting the short message to the incoming terminal through the roaming gateway, the second short message service center, and the incoming MSC.

BRIEF DESCRIPTIONS OF THE DRAWINGS

The above objects and other advantages of the present invention will become more apparent by detailed descriptions of the preferred embodiments thereof with reference to the attached drawings, in which:

FIG. 2a and FIG. 2b are flowcharts illustrating the process of providing a calling information based on HLR according to one preferred embodiment of the present invention.

FIG. 3 is a flowchart illustrating the process of providing a calling information based on HLR according to another preferred embodiment of the present invention.

FIG. 4a and FIG. 4b are flowcharts illustrating the process of providing a calling information based on MSC according to one preferred embodiment of the present invention.

FIG. 5a and FIG. 5b are flowcharts illustrating the process of providing a calling information based on MSC according to another preferred embodiment of the present invention.

FIG. 6a and FIG. 6b are flowcharts illustrating the process of providing a calling information based on MSC according to another preferred embodiment of the present invention.

<A Key of Numerical References for the Major Parts of the Drawings>

100a, 100a', 100b: terminal(MT, Mobile Terminal)
200a, 200b: BTS(Base Transceiver System)
300a, 300b: BSC(Base Station Controller)
400a, 400b: MSC(Mobile Switching Center)
800: calling information providing system
900: SMSC(Short Message Service Center)
820: calling information providing server
840: database server
860: web server/WAP server
880: IVR server Embodiment Hereinafter, preferred embodiments of the present invention will be described in more detail with reference to the accompanying drawings, but it should be understood that the present invention should not be limited to the following embodiments.

Figure 1:
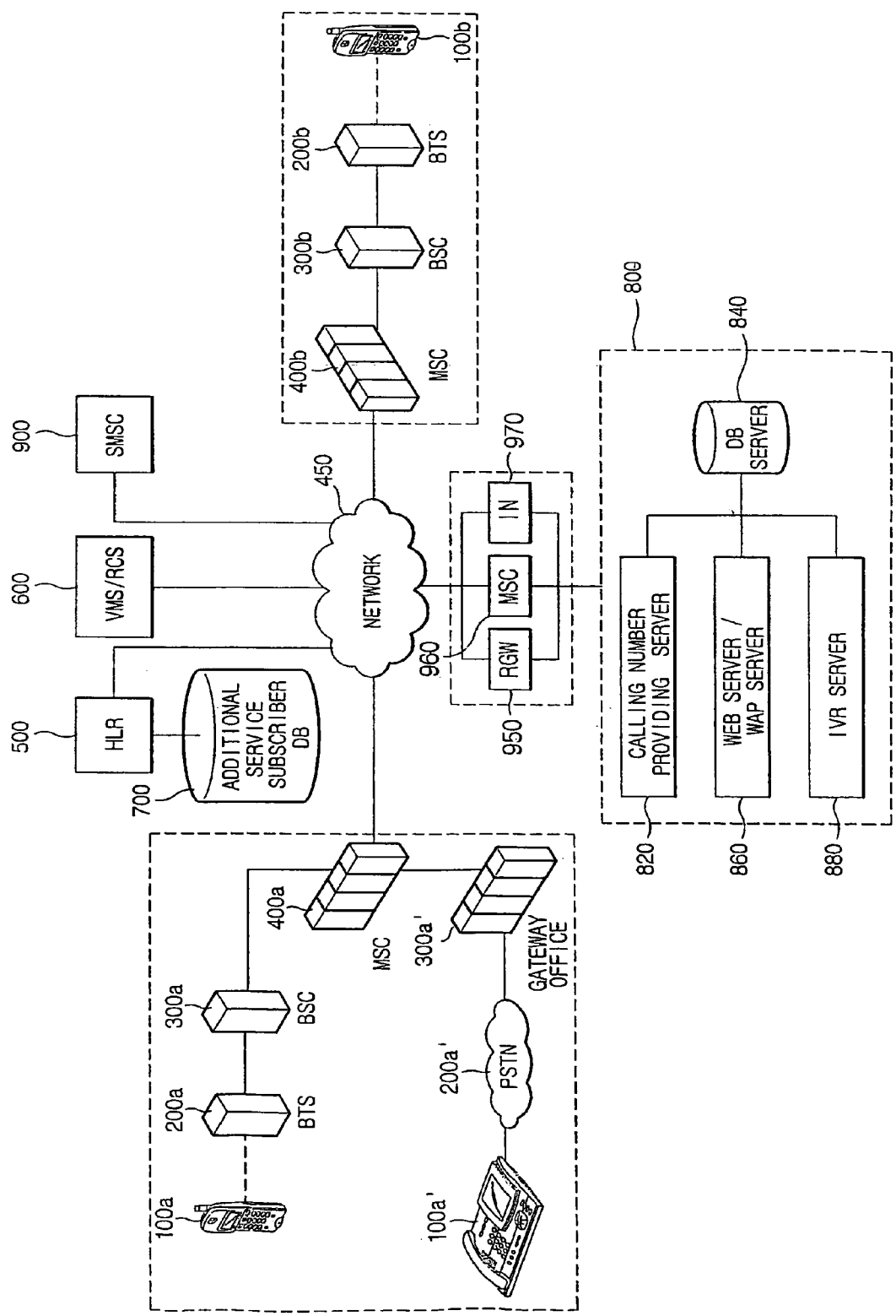
FIG. 1 is a schematic diagram illustrating the connection of a calling information providing system and a terminal in the present invention.

FIG. 1 is a schematic diagram illustrating the connection of a calling information providing system and a terminal in the present invention. The present invention is a calling information providing system based on MSC. Referring to FIG. 1, the calling information providing system is composed of a MT(Mobile Terminal) 100a, 100a', 100b; BTS (Base Transceiver System) 200a, 200b; BSC(Base Station Controller) 300a, 300b; MSC(Mobile Switching Center) 400a, 400b; PSTN(Public Switched Telephone Network) 200a'; GMSC(Gateway Mobile Services Switching Center) 300a'; HLR(Home Location Register) 500; VMS/RCS apparatus(Voice Mail System/Response Calling System) 600; additional service subscriber DB 700; calling information providing system 800; and SMSC(Short Message Service Center) 900.

MT(Mobile Terminal) 100a, 100a', 100b is a terminal that can be provided with a mobile communication service and a calling information providing service regarding an incomplete call. The BTS(Base Transceiver System) 200a, 200b accomplishes a mobile connection between the mobile terminal 100a, 100a', 100b and another mobile terminal 100a, 100a', 100b. Also, the BTS(Base Transceiver System) 200a, 200b accomplishes a connection between the mobile terminal 100a, 100a', 100b and the BSC(Base Station Controller) 300a, 300b. Further, the BSC(Base Station Controller) 300a, 300b is located between the BTS(Base Transceiver System) 200a, 200b and the MSC(Mobile Switching Center) 400a, 400b and performs BTS 200a, 200b management and control.

The MSC(Mobile Switching Center) 400a, 400b is mobile communication switching for providing a mobile phone subscriber with mobile communication service. The MSC(Mobile Switching Center) 400a, 400b accomplishes circuit switching between subscribers, input/output relay, handoff, etc. and is connected with the VLR(Visitor Location Register). The VLR(Visitor Location Register) accomplishes roaming function with another system when another terminal enters within the jurisdiction.

Further explanation will be made assuming that the MSC (Mobile Switching Center) 400a, 400b comprises the VLR (Visitor Location Register). The calling information providing system of the present invention can be divided into a calling side system and an incoming side system. The calling side system comprises a calling terminal 100a, 100a', calling BTS 200a, calling BSC 300a, PSTN 200a', GMSC(Gateway Mobile Services Switching Center) 400a', and calling MSC 400a. Also the incoming side system comprises a calling terminal 100b, incoming BTS 200b, incoming BSC 300b, and incoming MSC 400b.

The calling terminal 100a, 100a' comprises a mobile terminal(Mobile Telephone) 100a and a wire terminal(Wire Telephone) 100a'. The calling terminal 100a, 100a' can be connected with the calling MSC 400a through the calling BTS 200a and the calling BSC 300a. The wire terminal 100a' can be connected with the GMSC 300a' through the PSTN 200a'. The calling terminal 100a, 100a' is connected with the incoming MSC 400b through the calling MSC 400a and connected with the incoming terminal 100b through the incoming, BSC 300b and the incoming BTS 200b.

Further explanation when the calling terminal is a mobile terminal is given. The incoming MSC 400b can create and provide incomplete call information corresponding to the state of the incoming terminal 100b. The incomplete call information comprises recognizable incomplete call information and unrecognizable incomplete call information. Also, the incomplete call information, which is provided for a calling MSC 400a, can comprise identification information for identifying the incomplete call information. The calling MSC 400a and the incoming MSC 400b can be connected with the HLR(Home Location Register) 500, VMS/RCS apparatus 600, and SMSC(Short Message Service Center) 900 through a network.

An explanation will be given when the SMSC 900 provides the calling information, but a long message service center and a multimedia message service center can also provide the calling information.

The HLR(Home Location Register) 500 can provide the information of state whether or not a current call connects by providing the information of state of an incoming terminal 100*b*. The HLR(Home Location Register) can manage not only the current location information of a terminal but also a subscriber's situation, statistics, and service information. The HLR 500 can provide VMS service or RCS service by connecting With the VMS/RCS apparatus 600. Also, the HLR 500 determines whether or not the incoming terminal 100*b* is a subscriber of a calling information providing service regarding an incomplete call by referring to the additional service subscriber DB 700. If the incoming terminal is the subscriber of a calling information providing service regarding an incomplete call, then the calling information providing service is provided.

The calling information providing system 800 comprises a calling information providing server 820 and a database server 840. Also the calling information providing system 800 can further comprise a WEB server/WAP server 860 and an IVR server 880.

The calling information providing server 820 can create a short message comprising a calling information and transmit the message to the SMSC(Short Message Service Center) 900. The database server 840 stores the incomplete call information corresponding to the incoming terminal 100*b*. The WEB server/WAP server 860 or the IVR server 880 can provide the incoming terminal 100*b* with the calling information regarding an incomplete call by using Internet or voice.

The SMSC(Short Message Service Center) 900 receives a short message from the calling information providing system 800 and transmits the short message to the incoming terminal 100*b*. The calling information providing system 800 is illustrated as another external apparatus between the HLR(Home Location Register) 500 and the SMSC(Short Message Service Center) 900 but can be comprised in another apparatus or coupled with another apparatus.

For example, when the calling information providing system 800 is comprised in another apparatus, the calling information providing system 800 can be comprised in the SMSC(Short Message Service Center) 900 (See FIG. 5*c*) or in the VMS/RCS apparatus 600 (See FIG. 5*d*). As a second example, when the calling information providing system 800 is coupled with another apparatus, the calling information providing system 800 can be coupled with the Intelligent Network 970 and geared with the Intelligent Network 970 (See FIG. 3). Also, the calling information providing system 800 can be coupled with another network and 3G (3 Generation), and geared with them through the RGW (Roaming Gateway) 950.

One kind of an incomplete call is illustrated below in Table 1.

TABLE 1

| Kind of incomplete call | Contents |
| --- | --- |
| Recognizable incomplete call | Power off, receiving conversion, reception refusal, voice mail connection, No Page |
| Unrecognizable incomplete call | Busy, No Answer |

The recognizable incomplete call information is incomplete call information that can be recognized as an incomplete call situation by MSC or HRL. Recognizable incomplete call situations comprise power off, receiving conversion, reception refusal voice mail connection, and no page. Power off is when the power of receiver's telephone is off, and no page is when the telephone is located in an area that service is not offered. If the incoming terminal is set for receiving conversion and a call is received, then the call signal is transmitted to another telephone. Reception refusal is when the incoming terminal is set as a reception refusal state. If the incoming terminal is set as a voice mail connection and a call is received, then voice mail automatically connects.

The unrecognizable incomplete call information is incomplete call information that can be recognized as an incomplete call situation by MSC or HRL after attempting call connection with the incoming terminal. Even though the call is judged as incoming or enabled to call, but in fact the situation occurs that a call cannot be received or cannot connect a call may happen in real terms. These incoming impossible-to-connect cases vary such that a terminal ends by a strange cause or cannot receive a call signal temporarily. The unrecognizable incomplete call comprises busy, no answer, etc. Busy is ashen an incoming terminal is busy with another caller, and no answer is when a receiver cannot receive a telephone call because of the receiver's absence.

In the incomplete call information providing method and apparatus of the present invention, the incomplete call information can be provided by HLR(Home Location Register) or MSC(Mobile Switching Center). Hereinafter, we will explain the process based on HLR and the process based on MSC and call HLR or MSC the incomplete call information providing apparatus.

The Calling Information Providing Process Based on HLR

The SMSC(Short Message Service Center) 900 receives a short message from the calling information providing system 800 and transmits the short message to an incoming terminal 100*b*. According to the present invention, the method that the SMSC(Short Message Service Center) 900 transmits short message to the incoming terminal 100*b* can be accomplished readily in three ways.

According to the first preferred embodiment of the present invention, the calling information providing system 800 stores the calling information of an incomplete call. If the calling information providing system 800 receives information that the incoming terminal 100*b* can receive a short message from HLR/VLR 500, then the calling information providing system 800 transmits it to the SMSC(Short Message Service Center) 900. The SMSC(Short Message Service Center) 900 stores the received short message on a queue and transmits the short message to the incoming terminal 100*b* via the incoming MSC 400*b* sequentially.

According to the second preferred embodiment of the present invention the SMSC(Short Message Service Center) 900 transmits the short message periodically and repeatedly by using a scheduling function until the short message is normally transmitted to the incoming terminal 100*b*.

Hereinafter, preferred embodiments of the present invention will be described in more detail with reference to the accompanying drawings, but it is understood that the present invention should not be limited to the following embodiments.

The First Embodiment

FIG. 2*a* and FIG. 2*b* are flowcharts illustrating the process of providing a calling information based on HLR according to one preferred embodiment of the present invention. Hereinafter, we will explain the method for providing a calling information of an incomplete call according to the first embodiment in more detail with reference to FIG. 2.

If the incoming terminal 100*b* is connected to the incoming MSC 400*b* at the step S204, then the incoming MSC 400*b* transmits location information of the incoming terminal 100*b* to the HLR(Home Location Register) 500 S204.

The HLR(Home Location Register) 500 registers the incoming terminal's 100b location by using the received location information S207.

If the incoming MSC 400b receives recognizable incomplete call information from the incoming terminal 100b S209, then the incoming MSC 400b transmits the recognizable incomplete call information to the HLR(Home Location Register) 500 S211. The HLR(Home Location Register) 500 stores the received recognizable incomplete call information S213.

The calling terminal 100a, 100a' requests a call connection by transmitting the call information, which comprises the calling subscriber's number and the incoming subscriber's number, to the calling MSC 400a S214. The call connection information further comprises location information of the calling terminal 100a, 100a'.

The calling terminal 100a, 100a' comprises a mobile terminal(Mobile Telephone) 100a and a wire terminal(Wire Telephone) 100a'. If the calling terminal 100a, 100a' is a mobile terminal(Mobile Telephone) 100a, then the subscriber's number calls MIN(Mobile Identification Number), and the call connection information can further comprise the ESN(Electronic Serial Number) of the terminal.

If the calling MSC 400a requests the location information of the incoming terminal 100b from the HLR(Home Location Register) 500 S217, then the HLR(Home Location Register) 500 extracts recognizable incomplete call information of the incoming terminal 100b S219 and determines whether or not the incoming terminal 100b has the status of a recognizable incomplete call. If the incoming terminal 100b has the status of a recognizable incomplete call, then the HLR(Home Location Register) 500 requests the creation of a short message comprising a calling information to the calling information providing system 800 S237. If the incoming terminal 100b does not have the status of a recognizable incomplete call, then the process moves to step S221.

First, we will describe the process of providing the calling information of the incomplete call when a recognizable incomplete call exists. The calling MSC 400a requests the creation of a short message comprising a calling information from the calling information providing system 800 S237. Then, the calling information providing system 800 creates a short message comprising the calling information and stores it S239.

The calling information providing system 800 extracts at least a calling information comprising the subscriber's number from the incomplete call information and creates a short message comprising the calling number. The short message can further comprise a caller's location information as well as the calling number. Also, the short message can further comprise advertisement information about the service provider, the association company, and other companies.

Total capacity of the edited short message is 80 bytes preferably, but it is not limited and can be expanded. Also, according to one preferred embodiment of the present invention, the short message can comprise advertisement information. The calling information providing system 800 can include a database within and can store the short message on the database. That is, the system of the present invention further comprises an IVR(Interactive Voice Response) Server, a WAP(Wireless Application Protocol) Server plus a WEB Server, and searches for short message information, which is stored on the database, by using a communication medium such as IVR(Interactive Voice Response) system, WAP(Wireless Application Protocol) system, and WEB system.

If the incoming MSC 400b receives information that is ready to be received (receivable state information) from the incoming terminal 100b S241, then the incoming MSC 400b transmits the receivable state information to the HLR(Home Location Register) 500 S244. The HLR(Home Location Register) 500 transmits the receivable state information to the calling information providing system 800 S245. The calling information providing system 800 extracts the message corresponding to the incoming terminal 100b S247 and requests transmission of the extracted message to the SMSC (Short Message Service Center) 900 S271.

If the SMSC(Short Message Service Center) 900 transmits the short message to the incoming terminal 100b via the incoming MSC 400b S247, then the incoming terminal 100b receives the short message and creates information about receiving the message he message reception result information) S277. If the incoming terminal 100b transmits the message reception result information to the calling information providing system 800 via the incoming MSC 400b and the SMSC(Short Message Service Center) 900 S279, then the calling information providing system 800 stores the message reception result information of the incoming terminal 100b S281.

Hereinafter, we will describe the process of providing the calling information of the incomplete call when an unrecognizable incomplete call exists. If the call between the calling MSC 400a and the incoming MSC 400b connects S223, then the incoming MSC 400b attempts to connect the call to the incoming terminal 100b S251. If the call attempting time surpasses a predetermined time S254, then the incoming MSC 400b recognizes that the call has connected or is impossible to call and creates the unrecognizable incomplete call information S255. The unrecognizable incomplete call comprises busy, no answer, etc.

If the incoming MSC 400b transmits the Unrecognizable incomplete call information to the HLR(Home Location Register) 500 S257, then the HLR(Home Location Register) 500 requests creation of a message from the calling information providing system 800 S259. The calling information providing system 800 creates a short message comprising a calling information S261 and requests transmissions of the message to the SMSC(Short Message Service Center) 900 S271. After this point, all steps are similar with the steps of recognizable incomplete call.

The Second Embodiment

FIG. 3 is a flowchart illustrating the process of providing a calling information based on HLR according to another preferred embodiment of the present invention. In the first embodiment based on HLR, the short message is transmitted when the incoming terminal 100b is ready to be received. However, in the second embodiment, the system transmits a short message regardless of being ready to be received by using a scheduling function of the SMSC 900.

Hereinafter, we will describe the process of providing the calling information of the incomplete call according to the second embodiment by referring to FIG. 3. Also descriptions of parts similar to FIG. 2a and FIG. 2b will be omitted.

After the system has proceeded from the step S201 to the step S217 as described in the first embodiment, the HLR (Home Location Register) 500 extracts the recognizable incomplete call information of the incoming terminal 100b and determines whether or not the incoming terminal 100b has the status of a recognizable incomplete call S319.

If the incoming terminal 100b has the status of a recognizable incomplete call, then the calling information providing system 800 requests the creation of a message comprising calling information S359. If the incoming terminal 100b does not have the status of a recognizable incomplete call, then the process moves to the step S321.

First, we will describe the process of providing the calling information of the incomplete call when a recognizable incomplete call exists. The calling MSC 400a requests creation of a short message comprising a calling information from the calling information providing system 800 S359. Then the calling information providing system 800 creates a short message comprising the calling information S361 and requests transmission of the short message to the SMSC (Short Message Service Center) 900 S371.

Hereinafter, we will describe the process of providing the calling information of the incomplete call when an unrecognizable incomplete call exists. If the call between the calling MSC 400a and the incoming MSC 400b connects S323, then the calling MSC 400a attempts to connect the call with the incoming MSC 400b S351. If the attempting time surpasses a predetermined time as indicated at the step S354, then the incoming MSC 400b recognizes that the call has connected or is impossible to call and creates the unrecognizable incomplete call information S355. If the incoming MSC 400b transmits the unrecognizable incomplete call information to the HLR(Home Location Register) 500 S357, then the incoming, MSC 400b requests transmissions of the short message to the SMSC(Short Message Service Center) 900 S371.

The SMSC(Short Message Service Center) 900 stores the short message information on the database, which is connected with the SMSC, without dividing this kind of the incomplete call information. The short message information stored on the SMSC(Short Message Service Center) 900 can be requested and searched.

The SMSC(Short Message Service Center) 900 transmits the short message to the incoming terminal 100b via the incoming MSC 400b, the incoming BSC 300b, and the incoming BTS 200b by using the scheduling function S374. The scheduling function is a function that transmits the short message periodically and repeatedly at a predetermined time during a predetermined period until the short message is normally transmitted to the incoming terminal 100b. For example, the predetermined period can be a day and the time frame of the first several times can be 1 minute, and the time frame of the second several times can be 1 hour, and the time frame of the third several times can be 3 hours. If the incoming terminal 100b receives the short message normally, then the SMSC(Short Message Service Center) 900 stops transmitting.

We will omit description of those parts similar to FIG. 2a and FIG. 2b.

The Process of Providing a Calling Information Based on MSC

The present invention relates to a method and apparatus for providing a calling information of an incomplete call. That is, the usual method of providing a calling information based on HLR has some problems, for example, the incomplete call information must be provided through HLR. However, according to the present invention because the incoming MSC receives the incomplete call information directly, the process of the system is faster and more efficient.

The calling information providing method of the present invention can be embodied by the following three embodiments. According to the first embodiment of the present invention, the calling information providing system 800 is embodied independently and provides the calling information of the incomplete call. According to the second embodiment of the present invention, the calling information providing system 800 is coupled with the intelligent network. The calling information providing system 800 can comprise an IVR server, etc. and provide the calling information of the incomplete call. According to the third embodiment of the present invention, the calling information providing system 800 can provide the calling information of the incomplete call through RGW(Roaming Gateway) when the calling system and the incoming system are connected by the RGW(Roaming Gateway). The RGW(Roaming Gateway) is an apparatus for coupling the network of the present invention to another network. Hereinafter, we will describe the process of providing the calling information of an incomplete call based on the above examples.

The First Embodiment

Figure 4A:
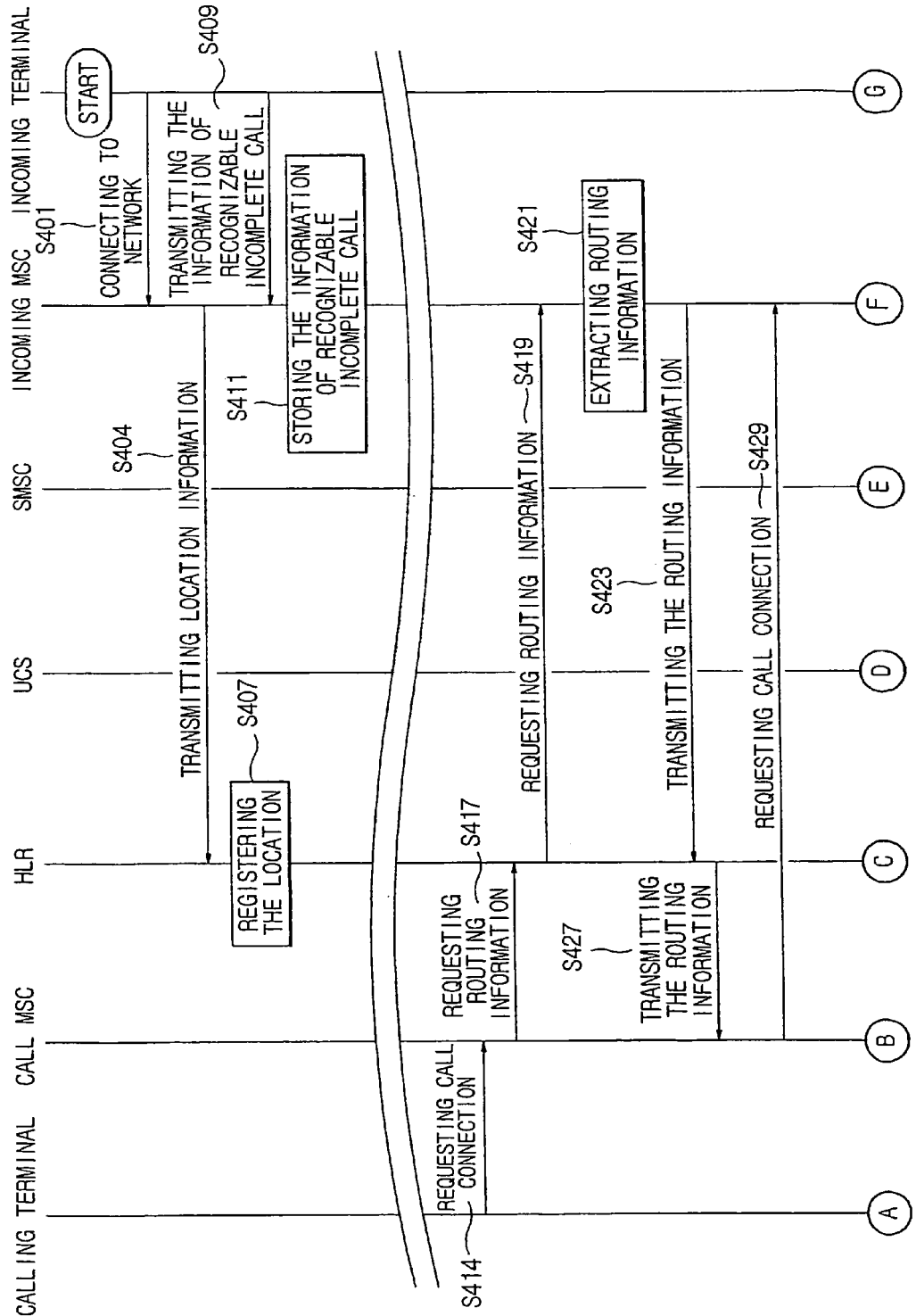

FIG. 4a and FIG. 4b are flowcharts illustrating the process of providing a calling information based on MSC according to one preferred embodiment of the present invention. Hereinafter, we will describe the process of providing the calling information of an incomplete call according to the first embodiment by referring to FIG. 4a and FIG. 4b.

If the incoming terminal 100b and the incoming MSC 400b are connected through the network S401, the incoming MSC 400b transmits the location information of the incoming terminal 100b to the HLR(Home Location Register) 500 S404. The HLR(Home Location Register) 500 registers the location of the incoming terminal 100b by using the received location information S407.

If the incoming MSC 400b receives the recognizable incomplete call information from the incoming terminal 100b S409, then the incoming MSC 400b stores the recognizable incomplete call information S411. The incoming MSC 400b can transmit the recognizable incomplete call information to the HLR(Home Location Register) 500.

The calling terminal(100a, 100a') requests call connection by transmitting the call connection information, which comprises the calling subscriber's number and the incoming subscriber's number, to the calling MSC 400a S414. The call connection information further comprises location information of the calling terminal 100a, 100a'.

The calling terminal 100a, 100a' comprises a mobile terminal(Mobile Telephone) 100a and a wire terminal(Wire Telephone) 100a'. When the calling terminal 100a, 100a' is a mobile terminal(Mobile Telephone) 100a, the subscriber's number can be called MIN(Mobile Identification Number), and the call connection information can further comprise the ESN(Electronic Serial Number) of the terminal.

If the calling MSC 400a requests routing information of the incoming MSC 400b from the HLR(Home Location Register) 500 S417, then the HLR(Home Location Register) 500 requests the routing information from the incoming MSC 400b S419. The incoming MSC 400b extracts routing information S421 and transmits the routine information to the calling MSC 400a via the HLR(Home Location Register) 500 S423, S427.

The calling MSC 400a can connect to the incoming MSC 400b by using the routing information and requests call connection to the incoming MSC 400b S429. The incoming MSC 400b extracts recognizable incomplete call information of the incoming terminal 100b S219 and determines whether or not the incoming terminal 100b has the status of a recognizable incomplete call S431. If the incoming terminal 100b has the status of a recognizable incomplete call, then the incoming MSC 400b transmits the incomplete call information to the calling MSC 400a S434. If the incoming terminal 100b does not have the status of a recognizable incomplete call, then the incoming MSC 400b attempts call connection to the incoming terminal 100b S451.

First, we will describe the process of providing the calling information of the incomplete call when recognizable incomplete call information exists. If the calling MSC 400a receives the incomplete call information from the incoming MSC 400b S434, then the calling MSC 400a requests creation of a short message comprising a calling information from the calling information providing system 800 S437. Then, the calling information providing system 800 creates a short message comprising the calling information and stores it S439.

If the incoming MSC 400b receives information ready to be received (receivable state information) from the incoming terminal 100b S441, then the incoming MSC 400b transmits the receivable state information to the calling information providing system 800 S444.

The calling information providing system 800 extracts the message corresponding to the incoming terminal 100b S447 and requests transmission of the extracted message to the SMSC(Short Message Service Center) 900 S471.

If the SMSC(Short Message Service Center) 900 transmits the short message to the incoming terminal 100b via the incoming MSC 400b S447, then the incoming terminal 100b receives the short message and creates information about receiving the message(the message reception result information) S477. If the incoming terminal 100b transmits the message reception result information to the calling information providing system 800 via the incoming MSC 400b and the SMSC(Short Message Service Center) 900 S479, then the calling information providing system 800 stores the message reception result information of the incoming terminal 100b S481.

Hereinafter, we will describe the process of providing the calling information of the incomplete call when an unrecognizable incomplete call exists. The incoming MSC 400b attempts to connect a call with the incoming terminal 100b S451. If the attempting time surpasses a predetermined time as in the step S454, then the incoming MSC 400b recognizes that the call has connected or is impossible to call and creates the unrecognizable incomplete call information S455. The unrecognizable incomplete call comprises busy, no answer, etc.

If the incoming MSC 400b transmits the unrecognizable incomplete call information to the calling, MSC 400a S457, then the callings MSC 400a requests creation of a message from the calling information providing system 800 S459. The calling, information providing system 800 creates a short message comprising calling information S261 and requests transmission of the message to the SMSC(Short Message Service Center) 900 S271. After this point, all steps are similar with the steps of a recognizable incomplete call.

It Is also proper that the incoming MSC 400b can request creation of a message from the calling information providing system 800 without going through the calling MSC 400a.

The calling information providing system 800 creates a short message comprising a calling information S461 and requests transmission of the message to the SMSC(Short Message Service Center) 900 S471. After this point, the steps are similar with the steps of a recognizable incomplete call.

The Second Embodiment

Figure 5B:
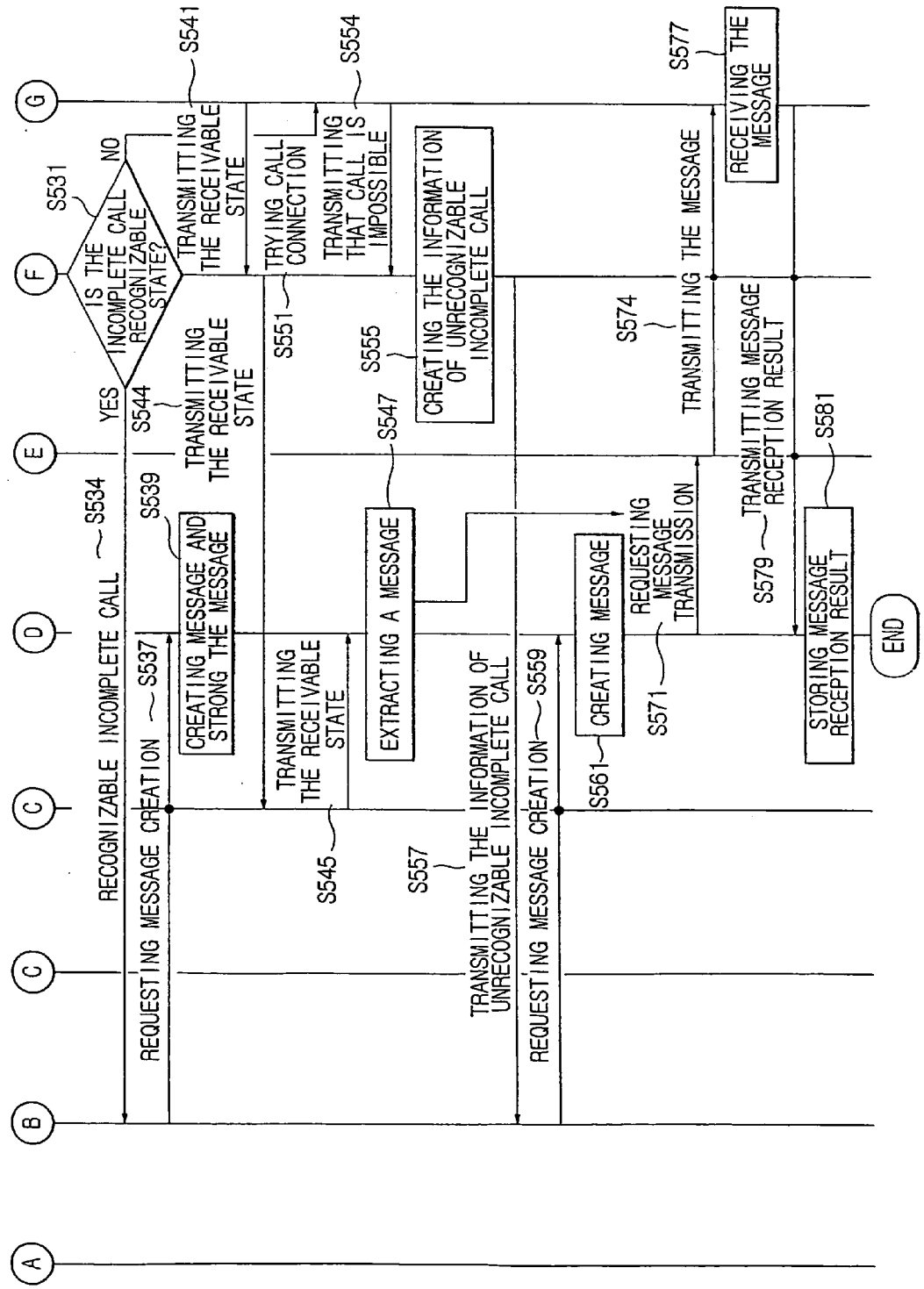

FIG. 5a and FIG. 5b are flowcharts illustrating the process of providing a calling information based on MSC according to another preferred embodiment of the present invention.

According to the second embodiment of the present invention, the calling information providing system 800 is coupled with the intelligent network. The calling information providing system 800 can be coupled with another MSC 960 by comprising IVR server, etc. The system of the present invention further comprises IVR(Interactive Voice Response) Server, WAP(Wireless Application Protocol) Server, plus WEB Server and searches short message information, which is stored on the database 840.

Hereinafter, we will describe the process of providing the calling information of an incomplete call according to the second embodiment by referring to FIG. 5a and FIG. 5b. In particular, we will emphasize the part that is different from the first embodiment.

In the process of providing the calling information, the calling MSC 400a requests creation of a message, which comprises the calling information, from the calling information providing system 800 via the intelligent network 970 or MSC 960 S537. During the process when an unrecognizable incomplete call exists, the calling MSC 400a requests creation of a message, which comprises the calling information, from the calling information providing system 800 via the intelligent network 970 or MSC 960 S559. We will omit the description of the part similar to FIG. 2a and FIG. 2b.

The Third Embodiment

FIG. 6a and FIG. 6b are flowcharts illustrating the process of providing a calling information based on MSC according to another preferred embodiment of the present invention.

According to the third embodiment of the present invention, the calling information providing system 800 can provide the calling information of the incomplete call through RGW(Roaming Gateway) when the calling system and the incoming system are connected by the RGW(Roaming Gateway). Furthermore, according to the third embodiment of the present invention, the SMSC(Short Message Service Center) can be equipped within the network of the calling information providing system 800 or another network. Accordingly, we will call the SMSC(Short Message Service Center), which is equipped within the network of the calling information providing system 800, the first SMSC. In contrast we will call the SMSC(Short Message Service Center), which is equipped within another network, the second SMSC.

Hereinafter, we will describe the process of providing the calling information of an incomplete call according to the third embodiment by referring to FIG. 6a and FIG. 6b. In particular, we will emphasize the part that is different from the first embodiment.

If the incoming terminal 100b and the incoming MSC 400b are connected through the network S601, the incoming MSC 400b transmits the location information of the incoming terminal 100b to the RGW(Roaming Gateway) 950 S604. The RGW(Roaming Gateway) 950 stores the location information and requests registration of the information by the HLR(Home Location Register) 500 S605. The HLR (Home Location Register) 500 registers the location of the incoming terminal 100b by using the received location information S607.

If the incoming MSC 400b receives the recognizable incomplete call information from the incoming terminal 100b S609, then the incoming MSC 400b stores the recognizable incomplete call information S611. The calling terminal(100a, 100a') requests call connection by transmitting the call connection information, which comprises the calling subscriber's number and the incoming subscriber's number, to the calling MSC 400*a* S614.

If the calling MSC 400*a* requests routing information of the incoming MSC 400*b* from the HLR(Home Location Register) 500 S617, then the HLR(Home Location Register) 500 requests the routing information of the incoming MSC 400*b* to the RGW(Roaming Gateway) 950 S619. The RGW (Roaming Gateway) 950 extracts routing information S621 and transmits the routing information to the calling MSC 400*a* via the HLR(Home Location Register) 500 S623, S627.

Because the calling MSC 400*a* can connect to the incoming MSC 400*b* by using the routing information, the calling MSC 400*a* requests call connection from the incoming MSC 400*b* S629. The incoming MSC 400*b* extracts recognizable incomplete call information of the incoming terminal 100*b* S621 and determines whether or not the incoming terminal 100*b* has the status of a recognizable incomplete call.

If the incoming terminal 100*b* has the status of a recognizable incomplete call, then the incoming MSC 400*b* transmits the incomplete call information to the calling MSC 400*a* S634. If the incoming terminal 100*b* does not have the status of a recognizable incomplete call, then the incoming MSC 400*b* attempts call connection with the incoming terminal 100*b* S651.

First, we will describe the process of providing the calling information of the incomplete call when recognizable incomplete call information exists. If the calling MSC 400*a* receives the incomplete call information from the incoming MSC 400*b* S634, then the calling MSC 400*a* requests creation of a short message comprising the calling information from the calling information providing system 800 S637. Then, the calling information providing system 800 creates a short message comprising the calling information and stores it S639.

If the incoming MSC 400*b* receives information that is ready to be received(receivable state information) from the incoming terminal 100*b* S641, then the incoming MSC 400*b* transmits the receivable state information to the calling information providing system 800 via the RGW(Roaming Gateway) 950 S644. The calling information providing system 800 extracts a message corresponding to the incoming terminal 100*b* S647 and requests transmission of the extracted message to the SMSC(Short Message Service Center) 900 S671.

If the SMSC(Short Message Service Center) 900 transmits the short message to the incoming terminal 100*b* via the RGW(Roaming Gateway) 950 and the incoming MSC 400*b* S647, then the incoming terminal 100*b* receives the short message and creates information about receiving the message(the message reception result information) S677. If the incoming terminal 100*b* transmits the message reception result information to the calling information providing system 800 via the RGW(Roaming Gateway) 950, the incoming MSC 400*b* and the first SMSC(Short Message Service Center) 900 S679, then the calling information providing system 800 stores the message reception result information of the incoming terminal 100*b* S681.

Hereinafter, we will describe the process of providing the calling information of the incomplete call when an unrecognizable incomplete call exists. The incoming MSC 400*b* attempts to connect the call to the incoming terminal 100*b* S651. If the attempting time surpasses a predetermined time as in the step S654, then the incoming MSC 400*b* recognizes that the call has connected or is impossible to call and creates the unrecognizable incomplete call information S655. The unrecognizable incomplete call comprises busy, no answer, etc.

If the incoming MSC 400*b* transmits the unrecognizable incomplete call information to the calling MSC 400*a* via the RGW(Roaming Gateway) 950 S657, then the calling MSC 400*a* requests creation of a message to the calling information providing system 800 S659. It is also preferable that the incoming MSC 400*b* can request creation of a message from the calling information providing system 800 without going through the calling MSC 400*a*.

The calling information providing system 800 creates a short message comprising a calling information S661 and requests transmission of the message to the first SMSC (Short Message Service Center) 900 S671. After this point, the steps are similar with the steps of recognizable incomplete call.

The present invention should not be limited to the first embodiment or the third embodiment but rather can be modified or changed variously.

In the preceding description, the short message transmission procedure is explained according to the kind of the incomplete call information.

The SMSC(Short Message Service Center) 900 transmits the short message to the incoming, terminal 100*b* via the incoming MSC 400*b*, the incoming BSC 300*b*, and the incoming BTS 200*b* by using the scheduling function.

The Composition of the Calling Information Providing System

Figure 7:
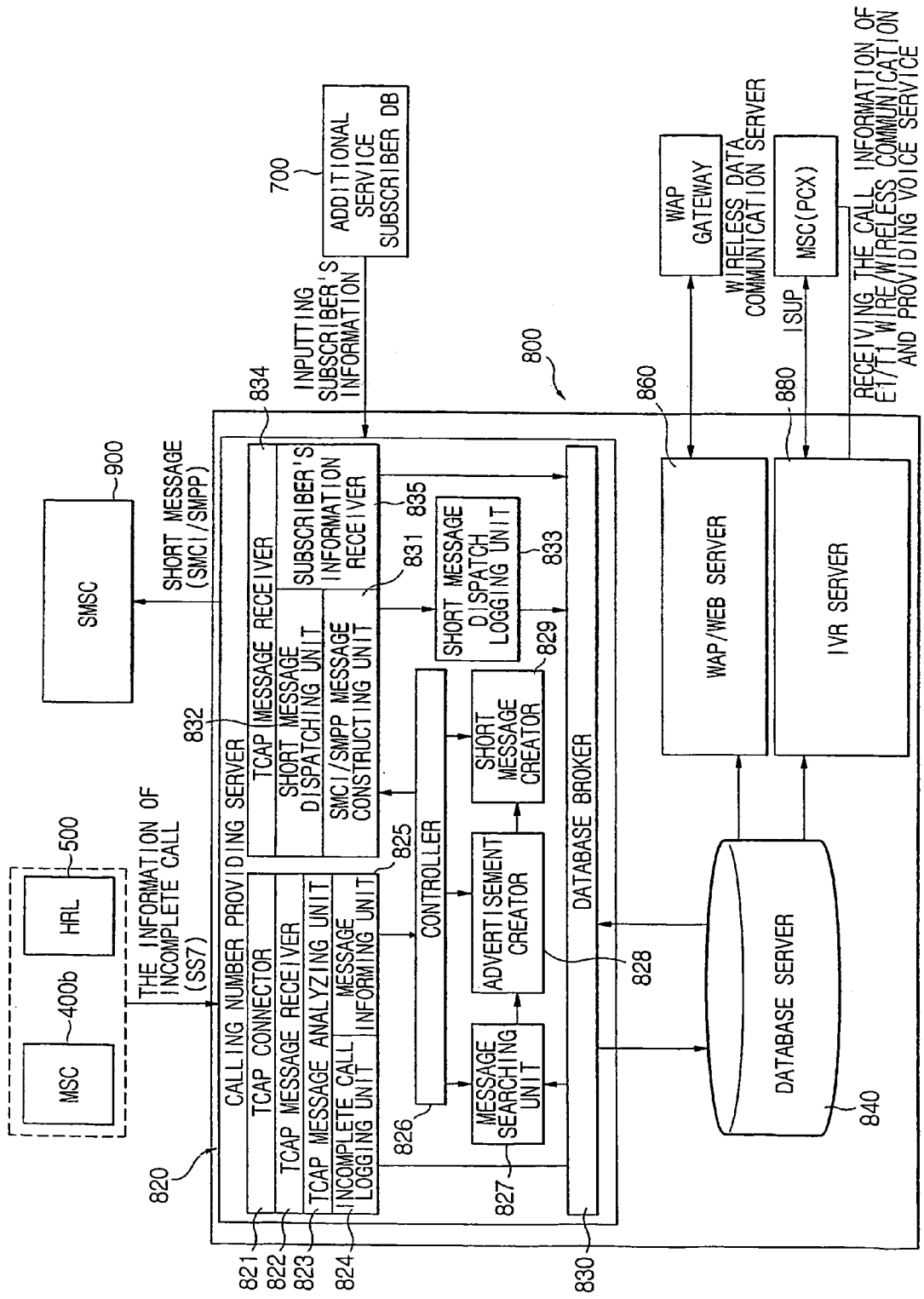
FIG. 7 is a schematic diagram illustrating the composition of a calling information providing system according to one preferred embodiment of the present invention.

FIG. 7 is a schematic diagram illustrating the composition of a calling information providing system according to one preferred embodiment of the present invention. Furthermore, we will describe the internal composition of the calling information providing system 800 when the calling information providing system 800 is embodied in a separate external apparatus by referring to FIG. 8*a* and FIG. 8*c*.

Referring to FIG. 7, the calling information providing system 800 comprises the calling information providing server 820 and the database server 840. The calling information providing server 820 is connected with the incoming MSC 400*b* and the SMSC(Short Message Service Center) 900. Also, the calling information providing server 820 comprises the TCAP connector 821, the TCAP message receiver 822, the TCAP message analyzing unit 823, the incomplete call logging unit 824, the message informing unit 825, the controller 826, the message searching unit 827, the short message creator 829, the database broker 830, the SMCI/SMPP message constructing unit 831, the short message dispatching unit 832, and the SMCI/SMPP connector 834. In addition, the calling information providing server 820 can further comprise the advertisement creator 828, the subscriber's information receiver 835, and the short message dispatch logging unit 833.

The TCAP connector 821 connects the incomplete call information providing apparatus, which comprises the incoming MSC 400*b* or the HLR(Home Location Register) 500, with the calling information providing server 820. The TCAP connector 821 transmits signal and data according to predetermined parameter information by a protocol such as VLR and SS7 of the incoming MSC 400*b*. The TCAP connector 821 connects with the incoming MSC 400*b* through the TCAP(Transaction Capabilities Application Part), which is a transaction function application unit, one of module for consisting the SS7 protocol, and receives data.

The TCAP message receiver 822 receives the incomplete call information through the TCAP connector 821, and the TCAP message analyzing unit 823 analyzes the received incomplete call information. The incomplete call logging unit 824 logs the analyzed incomplete call information in order to store it on the database server 840 through the database broker 830. Because the process from the caller's call request to the logging is accomplished almost during real time, the logging time can be handled as the caller's telephone call time. Also the caller's telephone call time is stored on the database server 840.

The message informing unit 825 transmits the incomplete call information which is received from the incoming MSC 400b, to the controller 826. In particular, the message informing unit 825 causes the controller 826 stand by states to occur according to the kind of the incomplete call information. Also the message informing unit 825 has control over requesting the short message transmission after receiving the receivable state information.

If the message searching unit 827 receives the receivable state information of the incoming terminal 100b, then the message searching unit 827 searches data such as the caller's subscriber number and the logging time of the incomplete call.

The advertisement creator 828 creates an advertisement sentence comprised of a short message. The short message creator 829 creates a short message by using the incomplete call information and transmits it to the controller 826. The short message can be created as one sentence by comprising not only the calling subscriber's number but also the incoming subscriber's number, the caller's location information, an advertisement sentence, telephone call time information, etc.

The controller 826 controls the operation of the searching unit 827, the advertisement creator 828, and the short message creator 829 in order to create the short message by using the incomplete call information. Also, the controller 826 transmits the created short message to the SMCI/SMPP message constructing unit 831. Furthermore, the controller 826 reserves the message transmission when the incoming terminal 100b has the status of an incomplete call. If the controller 826 receives the receivable state information of the incoming terminal 100b, then the controller 826 can search the incomplete call information, which is stored on the database server 840, and transmit a short message through the message searching unit 827.

If the incomplete call is recognizable, then the controller 826 transmits the short message directly by using the incomplete call information, which is received from the message informing unit 825.

The SMCI/SMPP message constructing unit 831 converts the format of the received short message into a format corresponding to SMCI or SMPP. SMCI and SMPP are protocols that are used for connecting to the SMSC(Short Message Service Center) 900.

The short message dispatching unit 832 transmits the short message, which is converted by the SMCI/SMPP message constructing unit 831, to the SMCI/SMPP connector 834. The short message dispatch logging unit 833 stores information that the short message dispatching unit 832 transmits about the short message(short message transmission information) on the database server 840 through the database broker 830.

The SMCI/SMPP connector 834 is a passage to the SMCI or SMPP, which are protocols for connecting to the SMSC (Short Message Service Center) 900. Also, the SMCI/SMPP connector 834 connects the calling information providing server 820 with the SMSC(Short Message Service Center) 900 and transmits the created short message to the SMSC (Short Message Service Center) 900.

The subscriber's information receiver 835 receives the subscriber's information such as indications of sex, age, and address from the additional service subscriber database 700 and stores it on the database server 840 through the database broker 830. The advertisement creator 828 extracts the stored subscriber's information from the database server 840 and creates an advertisement sentence corresponding to the incoming subscriber by using the subscriber's information.

The database server 840 stores the incomplete call information, which is received from the HLR(Home Location Register) 500, the telephone call time information, which is created by the incomplete call logging unit 824, and the subscriber's information and then extracts necessary information.

The database broker 830 is a connection passage between the calling information providing server 820 and the database server 840.

If the SMSC(Short Message Service Center) 900 receives the short message from the calling information providing system 800, then the SMSC(Short Message Service Center) 900 transmits the short message to the incoming terminal 100b via the incoming MSC 400b. The calling information providing system 800 can further comprise a WAP server or WEB server 860.

Referring to FIG. 7, the WAP/WEB server 860 can provide the calling information of the incomplete call to the user through wireless/wire Internet. The WAP/WEB server 860 searches the accumulated incomplete call information corresponding to the user from the database server and provides the accumulated incomplete call information to the user.

The calling information providing system 800 can further comprise IVR(Interactive Voice Response) server 880. The database server 840 searches for an item, which is requested by the user, and the IVR(Interactive Voice. Response) server 880 provides the searched information in conversation form for the user by using voice composition or voice combination. Also, the IVR(Interactive Voice Response) server 880 can provide the accumulated incomplete call information, which is searched by the database server, to the user via voice.

Figure 8A:
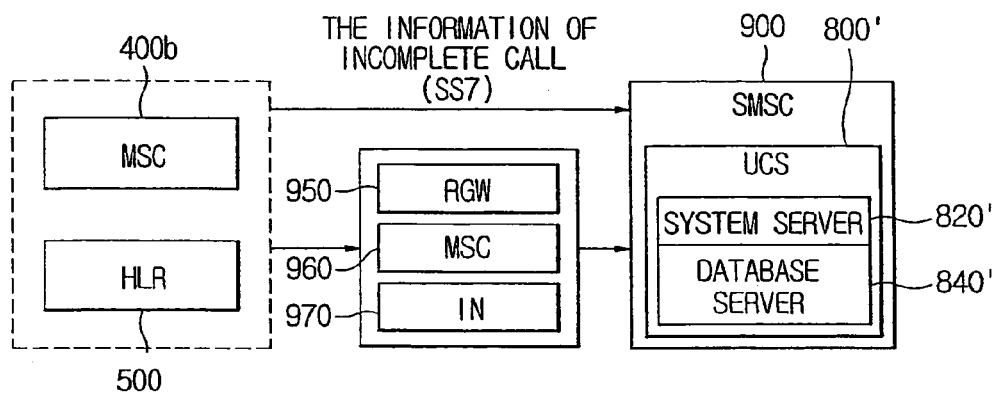
FIG. 8a and FIG. 8c are schematic diagrams illustrating the composition of a calling information providing system according to another preferred embodiment of the present invention.
Figure 8B:
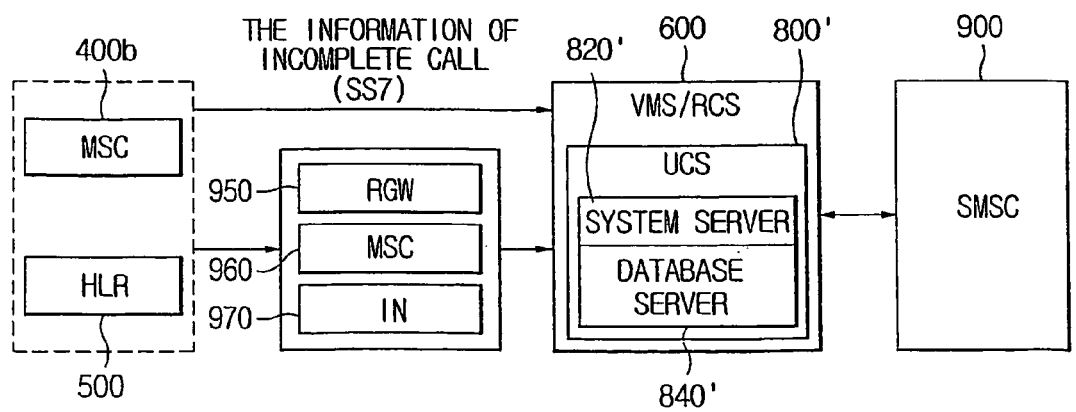
Figure 8C:
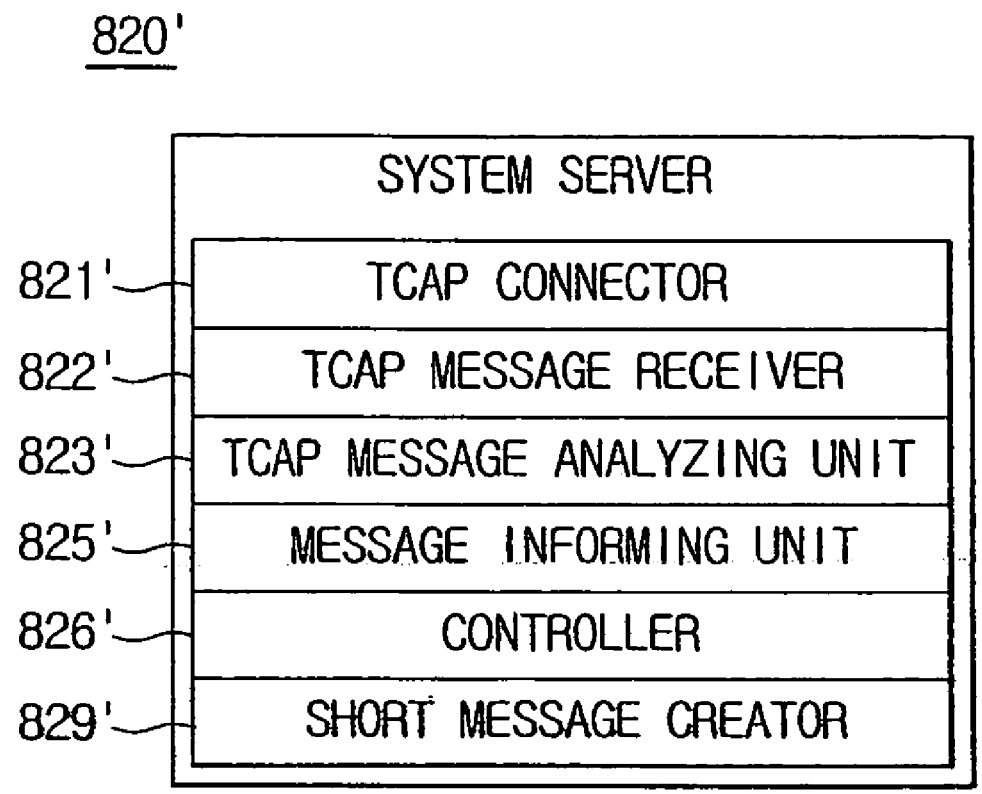

FIG. 8a and FIG. 8c are schematic diagrams illustrating the composition of a calling information providing system according to another preferred embodiment of the present invention. Referring to FIG. 8a, the calling information providing system 800' is composed in the SMSC(Short Message Service Center) 900 as a composition element. Referring to FIG. 8b, the calling information providing system 800' can is composed in the RCS or VMS as a composition element.

The calling information providing system 800' can directly receive the incomplete call information from the HLR(Home Location Register) 500 or the incoming MSC 400b. Alternatively the calling information providing system 800' can receive the incomplete call information via the RGW(Roaming Gateway) 950 or another MSC 960 or the intelligent network 970.

FIG. 8c is the schematic diagram of the inner part of the calling information providing system 800' when the calling information providing system 800' is composed like FIG. 8a and FIG. 8b.

Because the SMSC(Short Message Service Center) 900 of FIG. 8a and FIG. 8b provides the calling information only message transmission by using a scheduling function, the composition element of the calling information providing system can be very simple. If the controller 826' transmits the calling information to the SMSC(Short Message Service Center) 900 without dividing the incomplete call state of the incoming terminal 100b and the SMSC(Short Message Service Center) 900 transmits the calling information by using the scheduling function, then the composition element, which is related to data storage, such as the incomplete call logging unit, the message searching unit, and the database server can be eliminated.

That is, the calling information providing system 800' may comprise the TCAP connector 821', the TCAP message receiver 822', the TCAP message analyzing unit 823', the message informing unit 825', the controller 826', and the short message creator 829'.

We will omit the description of each element because the composition and function of each element of FIG. 8c is the same as those of the calling information providing system 800.

The service of providing a calling information of an incomplete call can be provided to the wireless communication subscriber. That is, if the incoming subscriber requests to add the calling information providing service as an additional service, then the wireless communication system registers the subscriber's information on the additional service subscriber database 700 and transmits the information to the HLR(Home Location Register) 500 and the calling information providing system 800.

If the incomplete call happens, then the HLR(Home Location Register) 500 determines whether or not the incoming terminal 100b is subscribed for the service. If the incoming terminal 100b is subscribed for the service, then the wireless communication system transmits the telephone call information and the state of the information to the calling information providing system 800.

Figure 9:
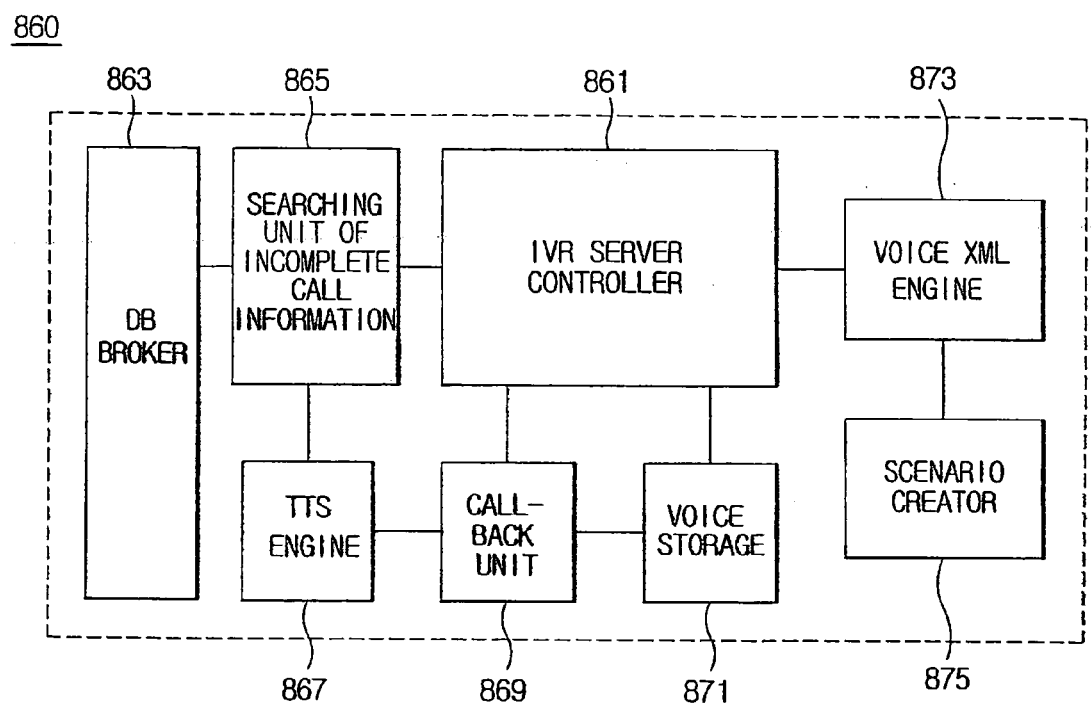
FIG. 9 is a schematic diagram illustrating the composition of IVR server in he present invention.

FIG. 9 is a schematic diagram illustrating the composition of an IVR server in the present invention. The IVR server 860 can comprise the IVR server controller 861, the searching unit for incomplete call information 865, the TTS engine 867, the callback unit 869, the voice storage 871, the database broker 863, the voice XML engine 873, and the scenario creator 875.

The searching unit of incomplete call information 865 can search incomplete call information, which is stored on the database server 840, through the database broker 863. The searched incomplete call information is converted to voice information through the TTS engine 867 and provided to the incoming terminal 100b. The voice storage 871 stores the voice information, which comprises guidance information except for a calling information.

The IVR server controller 861 can accomplish full-duplex audio response procedure according to the program, which is set up by the voice XML engine 873. Also, the IVR server controller 861 can modify the program, which is set up by the voice XML engine 873, by using the scenario creator 875.

When the incoming terminal 100b requests call connection from the calling terminal 100a, the callback unit 869 accomplishes call connection with the calling terminal 100b by using the calling terminal subscriber's number, which is included in the incomplete call information.

Figure 10:
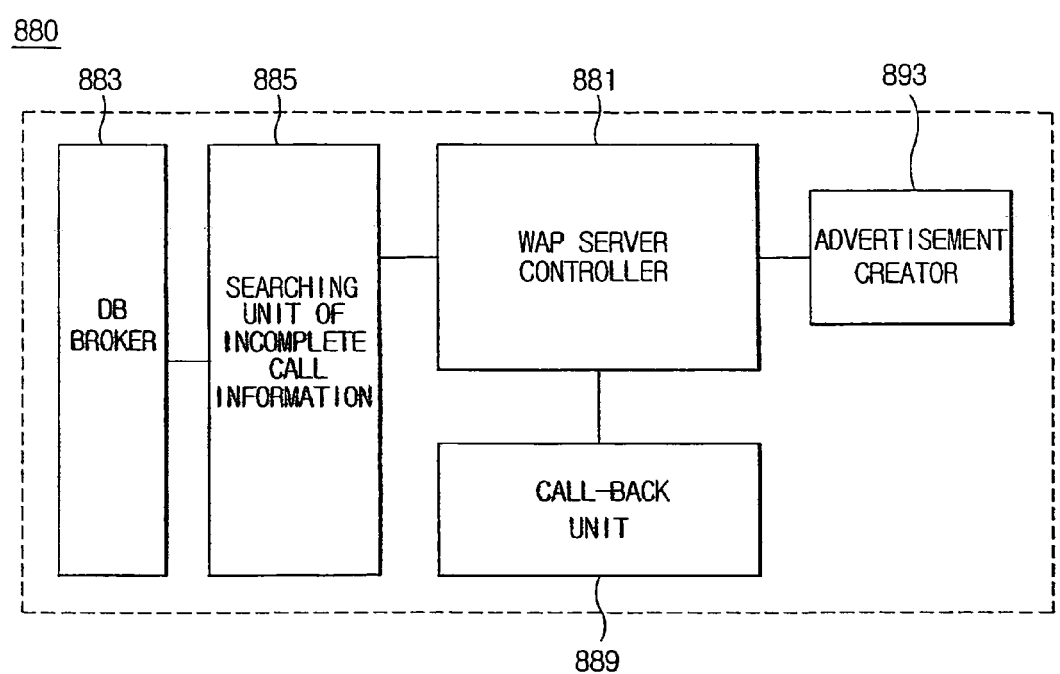
FIG. 10 is a schematic diagram illustrating the composition of WAP server in the present invention.

FIG. 10 is a schematic diagram illustrating the composition of WAP server in the present invention. The calling information providing system of the present invention can further comprise WEB server or WAP server. The WEB server is an apparatus for providing the calling information of the incomplete call to the user through wire Internet, and the WAP server is an apparatus for providing the calling information of the incomplete call to the user through wireless Internet.

Hereinafter, we will describe the composition of the WAP server in more detail by referring to FIG. 7.

The WAP server 880 can further comprise the WAP server controller 881, the searching unit for incomplete call information 885, the database broker 883, the callback unit 889, and the advertisement creator 893.

The searching unit for incomplete call information 885 can search for incomplete call information which is stored on the database server 840, through the database broker 883.

If the incoming terminal 100b, which is connected to the WAP server, requests a call connection with the calling terminal 100a by using the incomplete call information, then the callback unit 889 accomplishes the call connection with the calling terminal 100a by using the calling terminal subscriber's number, which is included in the incomplete call information.

Also, the WAP server 880 can comprise the advertisement creator 893 and provide an advertisement to the terminal, which connects to the WAP server 880.

The WAP server controller 881 can comprise the searching unit for incomplete call information 885, the database broker 883, and the callback unit 889. Further, the WAP server controller 881 controls each unit.

INDUSTRIAL APPLICABILITY

As described above and according to the present invention, the present invention is for providing a method and system for providing a calling information, a caller's location information, etc. to the incoming terminal without any operation by the caller when an incomplete call occurs.

Secondly, the present invention can provide a method and system for overcoming the disadvantages of VMS/RCS service that requires the caller to make a voice recording or manipulate a key button operation and the disadvantage of CNIP service that does not provide service regarding an incomplete call.

Thirdly, the present invention can provide a method and system for providing the calling information of an incomplete call efficiently based on HLR or MSC.

Fourthly, the present invention can provide a method and system for providing not only the calling number but also location information, advertisement information and improved public information effects.

Finally, the present invention can provide a method and system for providing the calling information of an incomplete call by connecting with the web server, WAP(Wireless Application Protocol) server, or IVR(Interactive Voice Response) server.

What is claimed is:

1. A calling information providing system that provides a calling information of an incomplete call, said system comprising:

TCAP connector that connects the calling information providing system with an incomplete call information providing apparatus;

TCAP message receiver that receives the incomplete call from the incomplete call information providing apparatus through the TCAP connector;

TCAP message analyzing unit that analyzes the incomplete call received by the TCAP message receiver;

message informing unit that transmits incomplete call information, which is transmitted from an incoming MSC, to a controller;

message creator that creates a message comprising the calling information, which is extracted from the incomplete call information, and transmitting the message to the controller;

the controller controls the operation of the message creator and transmitting the message to a SMCI/SMPP message constructing unit;

message searching unit that searches data such as caller's subscriber information of the incomplete call, when the message searching unit receives receivable state information of an incoming terminal;

the SMCI/SMPP message constructing unit converts the format of the message into SMCI/SMPP format;

message dispatching unit that transmits the message, which is transmitted from the SMCI/SMPP message constructing unit, to an SMCI/SMPP connector;

the SMCI/SMPP connector connecting the calling information providing system with the message service center; and short message service center(SMSC) that receives the message from the calling information providing system and that transmits the message to the incoming terminal via incoming MSC, wherein the calling information providing system comprises a database server, which stores the incomplete call information received from the incoming MSC, and a database broker, which connects the database server with the calling information providing system, and wherein the calling information providing system further comprises an IVR server, which comprises a searching unit of incomplete call information for searching incomplete call information stored on the database server, a TTS engine for converting searched incomplete call information into a voice signal, and a callback unit for connecting a call by a caller terminal corresponding to the caller information comprised in the incomplete call information.

2. The system of claim 1, wherein the incomplete call information providing apparatus is HLR(Home Location Register) or MSC(Mobile Switching Center).

3. The system of claim 1, wherein the calling information providing system further comprises an incomplete call logging unit, which creates incomplete logging time and sets up the incomplete logging time by time information for telephone call and stores the analyzed incomplete call information on the database server through the database broker, and a message searching unit, which searches the incomplete call information corresponding to the incoming terminal after the incoming terminal has become ready for receiving.

4. The system of claim 1, wherein the calling information providing system further comprises a message dispatch logging unit that stores the message transmission particulars of the message dispatch logging unit on the database server through the database broker.

5. The system of claim 1, wherein the calling information providing system further comprises a WAP server, which is a searching unit of incomplete call information that searches incomplete call information stored on the database server, and a callback unit that connects a call by a caller terminal corresponding to the caller information comprised in the incomplete call information.

6. The system of claim 1, wherein the calling information providing system further comprises an advertisement creator that creates an advertisement phrase.

7. The system of claim 1, wherein the calling information providing system is equipped within a VMS apparatus or an RCS apparatus.

8. The system of claim 1, wherein the incomplete call information is classified into recognizable incomplete call information and unrecognizable incomplete call information, and comprises identification information that identifies the incomplete call information.

9. The system of claim 1, wherein the message includes at least caller's number selected from caller's number, incoming subscriber's number, caller's location information, advertisement phrase, and call time.

10. A method for providing a calling information (providing) of an incomplete call, comprising:
    (a) receiving a call connection request comprising a caller's number and an incoming subscriber's number from a calling terminal
    (b) requesting location information corresponding to an incoming terminal from a HLR(home location register);
    (c) extracting location information and incomplete call information of the incoming terminal, wherein the incomplete call information is recognizable incomplete call information or unrecognizable incomplete call information;
    (d) transmitting request for message creating, which comprises the incomplete call information, to a calling information providing system;
    (e) creating a message comprising a calling information providing;
    (f) searching data such as the caller's subscriber information, when message searching unit receives receivable state information of an incoming terminal;
    (g) requesting message transmission for a message service center; and
    (h) transmitting the message to the incoming terminal through an incoming MSC,
    wherein if the incomplete call information is unrecognizable, then the method of step (f) further comprises:
    trying to connect a call to the incoming terminal; creating the information of unrecognizable incomplete call when call connection fails; and
    transmitting the information of unrecognizable incomplete call to the calling information providing system.

11. The method of claim 10, wherein if the incomplete call information is recognizable, then the method of step (f) further comprises:
    storing the message;
    receiving information regarding whether or not ready to be received;
    receiving information regarding whether or not ready to be received from the incoming MSC through the HLR (home location register); and
    extracting incomplete information corresponding to the incoming terminal.

12. The method of claim 10, wherein the calling information providing system transmits the message by using a scheduling function periodically until the incoming terminal receives the message.

13. The method of claim 10, wherein the message comprises advertisement information or caller's location information.

14. A method for providing a calling information of an incomplete call, comprising:
    (a) receiving a call connection request comprising a caller's number and an incoming subscriber's number from a calling terminal;

(b) requesting routing information about an incoming MSC from an incoming MSC, to which an incoming terminal connects;

(c) receiving the routing information from the incoming MSC;

(d) requesting a call connection with the incoming MSC;

(e) extracting incomplete call information corresponding to the incoming terminal, wherein the incomplete call information is recognizable incomplete call information or unrecognizable incomplete call information;

(f) transmitting a request for message creation, which comprises the incomplete call information, to a calling information providing system;

(g) creating a message comprising a calling information providing;

(h) searching data such as the caller's subscriber information, when message searching unit receives receivable state information of an incoming terminal;

(i) requesting message transmission to a message service center; and (j) transmitting the message to the incoming terminal through an incoming MSC, wherein if the incomplete call information is unrecognizable, then the method of step (h) further comprises:

trying to connect the call to the incoming terminal;

creating the information of unrecognizable incomplete call when call connection fails; and transmitting the information of unrecognizable incomplete call to the calling information providing system.

15. The method of claim 14, wherein the calling information providing system receives the request for message creation through an intelligent network, which is connected with the calling information providing system or another switching center.

16. The method of claim 14, wherein the incoming MSC transmits the request for message creation, which comprises the incomplete call information, to the calling information providing system through the calling MSC.

17. The method of claim 14, wherein if the incomplete call information is recognizable, then the method of step (h) further comprises:

storing the message;

receiving information regarding whether or not ready to be received;

receiving information regarding whether or not ready to be received from incoming MSC; and extracting incomplete information corresponding to the incoming terminal.

18. The method of claim 14, wherein the message comprises advertisement information or caller's location information.

19. A method for providing a calling information of incomplete call, comprising:

(a) receiving a call connection request comprising a caller's number and an incoming subscriber's number from a calling terminal;

(b) requesting routing information about an incoming MSC, to which incoming terminal connects to roaming gateway that is connected with the incoming MSC;

(c) receiving the routing information from the roaming gateway;

(d) requesting call connection with the incoming MSC;

(e) extracting incomplete call information corresponding to the incoming terminal;

(f) transmitting a request for message creation, which comprises the incomplete call information, to a calling information providing system;

(g) creating a message comprising a calling information providing;

(h) searching data such as the caller's subscriber information, when message searching unit receives receivable state information of an incoming terminal;

(i) requesting message transmission to the first message service center; and (j) transmitting the message to the incoming terminal through the roaming gateway, the second message service center, and the incoming MSC, wherein if the incomplete call information is unrecognizable, then the method of step (h) further comprises:

trying to connect the call to the incoming terminal;

creating the information of unrecognizable incomplete call when call connection fails; and transmitting the information of unrecognizable incomplete call to the calling information providing system.

* * * * *